(12) United States Patent
Bubb et al.

(10) Patent No.: US 12,734,726 B2
(45) Date of Patent: Sep. 15, 2026

(54) METHODS OF PLUGGING A PERMEABLE POROUS CELLULAR BODY

(71) Applicant: CORNING INCORPORATED, Corning, NY (US)

(72) Inventors: Keith Norman Bubb, Beaver Dams, NY (US); Anthony Joseph Cecce, Elmira, NY (US); Julie Marie Daugherty, Horseheads, NY (US); Kenneth Joseph Drury, Big Flats, NY (US); Patrick David Tepesch, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 108 days.

(21) Appl. No.: 18/823,906

(22) Filed: Sep. 4, 2024

(65) Prior Publication Data

US 2024/0424712 A1 Dec. 26, 2024

Related U.S. Application Data

(63) Continuation of application No. 17/415,172, filed as application No. PCT/US2019/066462 on Dec. 16, 2019, now Pat. No. 12,103,195.

(Continued)

(51) Int. Cl.
*B28B 11/00* (2006.01)
*B01D 46/00* (2022.01)
(Continued)

(52) U.S. Cl.
CPC ........ *B28B 11/007* (2013.01); *B01D 46/0001* (2013.01); *B28B 3/269* (2013.01);
(Continued)

(58) Field of Classification Search
CPC .................................................... B28B 11/007
See application file for complete search history.

(56) References Cited

U.S. PATENT DOCUMENTS 4,432,918 A 2/1984 Paisley
4,455,180 A 6/1984 Hillman et al.
(Continued)

FOREIGN PATENT DOCUMENTS

CN 1628210 A 6/2005
CN 104411658 A 3/2015
(Continued)

OTHER PUBLICATIONS

Chinese Patent Application No. 201980092753.0, Office Action, dated May 24, 2022, 4 pages, Chinese Patent Office.

(Continued)

*Primary Examiner* — Benjamin A Schiffman
(74) *Attorney, Agent, or Firm* — Kevin M. Able

(57) ABSTRACT

A method of plugging a permeable porous cellular body comprises: contacting the permeable porous cellular body with a plugging mixture, the permeable porous cellular body defining a plurality of channels; forcing the plugging mixture into the plurality of channels until a maximum, self-limiting, depth of plugging mixture is disposed within the plurality of channels; and maintaining a constant flow rate of the plugging mixture into the plurality of channels until a pressure on the plugging mixture elevates to a predetermined pressure. Alternatively, the method comprises forcing the plugging mixture into the plurality of channels utilizing the application of a constant pressure over time until a maximum, self-limiting, depth of the plugging mixture is disposed within the plurality of channels; and maintaining the constant pressure applied to the plugging mixture until (Continued)

flow of the plugging mixture into the channels decays from an initial flow rate to a predetermined flow rate.

20 Claims, 16 Drawing Sheets

Related U.S. Application Data

(60) Provisional application No. 62/783,679, filed on Dec. 21, 2018.

(51) Int. Cl.
*B28B 3/26* (2006.01)
*B29C 48/11* (2019.01)
*B29C 65/00* (2006.01)

(52) U.S. Cl.
CPC ......... *B29C 48/11* (2019.02); *B29C 66/72525* (2013.01); *B29C 66/7254* (2013.01)

(56) References Cited

U.S. PATENT DOCUMENTS

| | | | |
|---|---|---|---|
| 6,803,015 | B2 | 10/2004 | Vance et al. |
| 7,297,299 | B2 | 11/2007 | Gadkaree et al. |
| 7,387,657 | B2 | 6/2008 | Kunieda et al. |
| 7,722,791 | B2 | 5/2010 | Kimura et al. |
| 7,897,099 | B2 | 3/2011 | Suenobu et al. |
| 7,922,951 | B2 | 4/2011 | Mudd et al. |
| 8,029,737 | B2 | 10/2011 | Kudo et al. |
| 8,609,002 | B2 | 12/2013 | Cecce et al. |
| 8,782,893 | B2 | 7/2014 | Uoe et al. |
| 8,808,601 | B2 | 8/2014 | Brown et al. |
| 2005/0109023 | A1 | 5/2005 | Kudo et al. |
| 2005/0235621 | A1 | 10/2005 | Kunieda et al. |
| 2006/0131782 | A1 | 6/2006 | Mudd et al. |
| 2008/0241015 | A1 | 10/2008 | Kudo et al. |
| 2012/0186211 | A1 | 7/2012 | Kudo et al. |
| 2012/0248643 | A1 | 10/2012 | Cecce et al. |
| 2013/0036612 | A1 | 2/2013 | Uoe et al. |
| 2015/0121827 | A1 | 5/2015 | Cai et al. |
| 2023/0110252 | A1 | 4/2023 | Bergman et al. |

FOREIGN PATENT DOCUMENTS

| | | |
|---|---|---|
| EP | 1911570 A2 | 4/2008 |
| EP | 1964656 A2 | 9/2008 |

OTHER PUBLICATIONS

International Search Report and Written Opinion of the International Searching Authority; PCT/US2019/066462; dated Mar. 31, 2020; 11 pages; European Patent Office.

Tiller et al., "Theory of Filtration of Ceramics: II, Slip Casting on Radial Surfaces", Journal of the American Ceramic Society, vol. 74, Issue 1, 1991, 9 pages.

METHODS OF PLUGGING A PERMEABLE POROUS CELLULAR BODY

This application is a continuation of U.S. application Ser. No. 17/415,172, filed on Jun. 17, 2021, which is a National Stage application under 35 U.S.C. § 371 of International Application No. PCT/US2019/066462, filed on Dec. 16, 2019, which claims the benefit of priority under 35 U.S.C. § 119 of U.S. Provisional Patent Application Ser. No. 62/783,679 filed on Dec. 21, 2018, the content of which is relied upon and incorporated herein by reference in their entireties.

FIELD OF THE DISCLOSURE

The present disclosure generally relates to plugged permeable porous cellular bodies used as filters, and more specifically, to methods of plugging the permeable porous cellular bodies with a plugging mixture.

BACKGROUND

Particulate filters are used to filter fluids, such as liquid fuel that a vehicle utilizes, as well as the exhaust generated during combustion of the liquid fuel. The particulate filters include a permeable porous cellular body having a matrix of intersecting, thin, permeable porous walls that extend across and between two opposing end faces and form a large number of hollow channels. The channels extend between end faces of the filter. The end of some of the channels are plugged with a plugging mixture. The plugs force fluid that is introduced into an open end of a channel through the permeable porous walls surrounding the channel. The permeable porous walls filter the fluid as the fluid is forced therethrough.

There is a variety of processes to introduce a plugging mixture into a channel. In one process, a film blocks channels that should not be plugged but allows access to other channels to be plugged with the plugging mixture. Typically, a piston forces the plugging mixture into the channels that the film does not block, such that each of the channels to be plugged are plugged to a depth that is uniform across all of the plugged channels.

However, there is a problem in that the current processes to introduce the plugging mixture into the channels produces dimples (e.g., openings present on an exterior surface of the plug) at the open end of the plug and voids (e.g., free open spaces within the body of the plug) within the depth of the plug.

SUMMARY OF THE DISCLOSURE

The present disclosure solves that problem with a method that fills the channels with a plugging material until a self-limiting depth of plugging material is reached and then forces additional plugging material into the channels either: (a) at a constant pressure until a flow rate of the plugging material into the channels falls below a threshold flow rate; or (b) at a constant flow rate until a pressure applied to the plugging material exceeds a threshold pressure. Because the depth of the plugging material is self-limiting, the additional plugging material forced into the channels fills any potential voids and avoids the formation of dimples.

According to a first aspect of the present disclosure, a method of plugging a permeable porous cellular body comprises: contacting the permeable porous cellular body with a plugging mixture, the permeable porous cellular body defining a plurality of channels; forcing the plugging mixture into the plurality of channels until a maximum, self-limiting, depth of plugging mixture is disposed within the plurality of channels; and maintaining a constant flow rate of the plugging mixture into the plurality of channels until a pressure on the plugging mixture elevates to a predetermined pressure. In embodiments, the predetermined pressure is from about 5 psi to about 100 psi. In embodiments, the predetermined pressure is from about 20 psi to about 50 psi. In embodiments, the predetermined pressure is from about 10 psi to about 40 psi.

In embodiments, the method further comprises heating the plugging mixture in the permeable porous cellular body to form a plurality of plugs. In embodiments, heating the plugging mixture is performed at a temperature of from about 800° C. to about 1500° C. In embodiments, the method further comprises, before heating the plugging mixture in the permeable porous cellular body to form a plurality of plugs, heating the plugging mixture in the permeable porous cellular body to calcine the plugging mixture.

In embodiments, the permeable porous cellular body includes intersecting walls that separate the plurality of channels, and the intersecting walls are permeable and porous. In embodiments, the permeable porous cellular body is a ceramic.

According to a second aspect of the present disclosure, a method of plugging channels of a permeable porous cellular body comprises: contacting a permeable porous cellular body with a plugging mixture, the permeable porous cellular body defining a plurality of channels; forcing the plugging mixture into the plurality of channels utilizing application of a constant pressure over time until a maximum, self-limiting, depth of the plugging mixture is disposed within the plurality of channels; and maintaining the constant pressure applied to the plugging mixture until flow of the plugging mixture into the plurality of channels decays from an initial flow rate to a predetermined flow rate.

In embodiments, the predetermined flow rate is 25% or less of the initial flow rate. In embodiments, the predetermined flow rate is about 10% or less of the initial flow rate. In embodiments, the predetermined flow rate is about 5% or less of the initial flow rate. In embodiments, the constant pressure is from about 1 psi to about 50 psi. In embodiments, the constant pressure is from about 15 psi to about 40 psi. In embodiments, the method further comprises heating the plugging mixture in the permeable porous cellular body to form a plurality of plugs. In embodiments, heating the plugging mixture is performed at a temperature of from about 800° C. to about 1500° C. In embodiments, the method further comprises, before heating the plugging mixture in the permeable porous cellular body to form a plurality of plugs, heating the plugging mixture in the permeable porous cellular body to calcine the plugging mixture. In embodiments, the permeable porous cellular body comprises from about 100 channels per square inch to about 900 channels per square inch. In embodiments, the permeable porous cellular body includes intersecting walls that separate the plurality of channels, and the intersecting walls are permeable and porous. In embodiments, the permeable porous cellular body is a ceramic.

According to a third aspect of the present disclosure, a method of plugging a permeable porous cellular body to a desired maximum, self-limiting, depth comprises: (A) contacting a permeable porous cellular body with a plugging mixture, the permeable porous cellular body defining a plurality of channels; and (B) either (i) forcing the plugging mixture into the plurality of channels at a first constant flow rate until a first maximum, self-limiting, depth of plugging mixture is disposed within the plurality of channels and maintaining the first constant flow rate of the plugging mixture into the plurality of channels until a pressure on the plugging mixture elevates to a predetermined pressure, or (ii) forcing the plugging mixture into the plurality of channels at a first constant pressure until a first maximum, self-limiting, depth of plugging mixture is disposed within the plurality of channels and maintaining the first constant pressure applied to the plugging mixture until flow of the plugging mixture into the plurality of channels decays from an initial flow rate to a predetermined flow rate; (C) comparing the first maximum, self-limiting, depth to a desired second maximum, self-limiting, depth; (D) changing one or more of the following: (i) the first constant pressure to a second constant pressure; (ii) the first constant flow rate to a second constant flow rate; (iii) a first hydraulic diameter $d_h$ of the plurality of channels to a second hydraulic diameter $d_h$; (iv) a first absorptive capacity of the porous cellular body to a second absorptive capacity; (v) a first permeability of inorganic particles within the plugging mixture to a second permeability; (vi) a first viscosity of liquid in the plugging mixture to a second viscosity; (vii) a first viscosity of the plugging mixture to a second viscosity; and (E) performing (A) and (B) again until the second maximum, self-limiting depth of the plugging mixture is disposed within the plurality of channels.

In embodiments, the second maximum, self-limiting, depth of the plugging mixture is deeper than the first maximum, self-limiting, depth; and the second constant pressure is higher than the first constant pressure. In embodiments, the second maximum, self-limiting, depth of the plugging mixture is deeper than the first maximum, self-limiting, depth; and the second constant flow rate is greater than the first constant flow rate. In embodiments, the second maximum, self-limiting, depth of the plugging mixture is deeper than the first maximum, self-limiting, depth; and the second hydraulic diameter $d_h$ is wider than the first hydraulic diameter $d_h$. In embodiments, the second maximum, self-limiting, depth of the plugging mixture is deeper than the first maximum, self-limiting, depth; and the second absorptive capacity of the porous cellular body is less than the first absorptive capacity. In embodiments, the second maximum, self-limiting, depth of the plugging mixture is deeper than the first maximum, self-limiting, depth; and the second permeability of inorganic particles within the plugging mixture is less than the first permeability. In embodiments, the second maximum, self-limiting, depth of the plugging mixture is deeper than the first maximum, self-limiting, depth; and the second viscosity of the liquid in the plugging mixture is greater than the first viscosity while maintaining approximately the same overall viscosity of the plugging mixture. In embodiments, the second maximum, self-limiting, depth of the plugging mixture is deeper than the first maximum, self-limiting, depth; and the second viscosity of the plugging mixture is less than the first viscosity of the plugging mixture while maintaining approximately the same viscosity of liquid in the plugging mixture.

In embodiments, the second maximum, self-limiting, depth of the plugging mixture is shallower than the first maximum, self-limiting, depth; and the second constant pressure is lower than the first constant pressure. In embodiments, the second maximum, self-limiting, depth of the plugging mixture is shallower than the first maximum, self-limiting, depth; and the second constant flow rate is less than the first constant flow rate. In embodiments, the second maximum, self-limiting, depth of the plugging mixture is shallower than the first maximum, self-limiting, depth; and the second hydraulic diameter $d_h$ is narrower than the first hydraulic diameter $d_h$. In embodiments, the second maximum, self-limiting, depth of the plugging mixture is shallower than the first maximum, self-limiting, depth, and the second absorptive capacity of the porous cellular body is greater than the first absorptive capacity. In embodiments, the second maximum, self-limiting, depth of the plugging mixture is shallower than the first maximum, self-limiting, depth; and the second absorptive capacity of the porous cellular body is greater than the first absorptive capacity. In embodiments, the second maximum, self-limiting, depth of the plugging mixture is shallower than the first maximum, self-limiting, depth; and the second viscosity of the liquid in the plugging mixture is less than the first viscosity while maintaining approximately the same overall viscosity of the plugging mixture. In embodiments, the second maximum, self-limiting, depth of the plugging mixture is shallower than the first maximum, self-limiting, depth; and the second viscosity of the plugging mixture is greater than the first viscosity while maintaining approximately the same viscosity of the liquid in the plugging mixture.

These and other features, advantages, and objects disclosed herein will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

The construction and arrangement of the elements of the present disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 1:
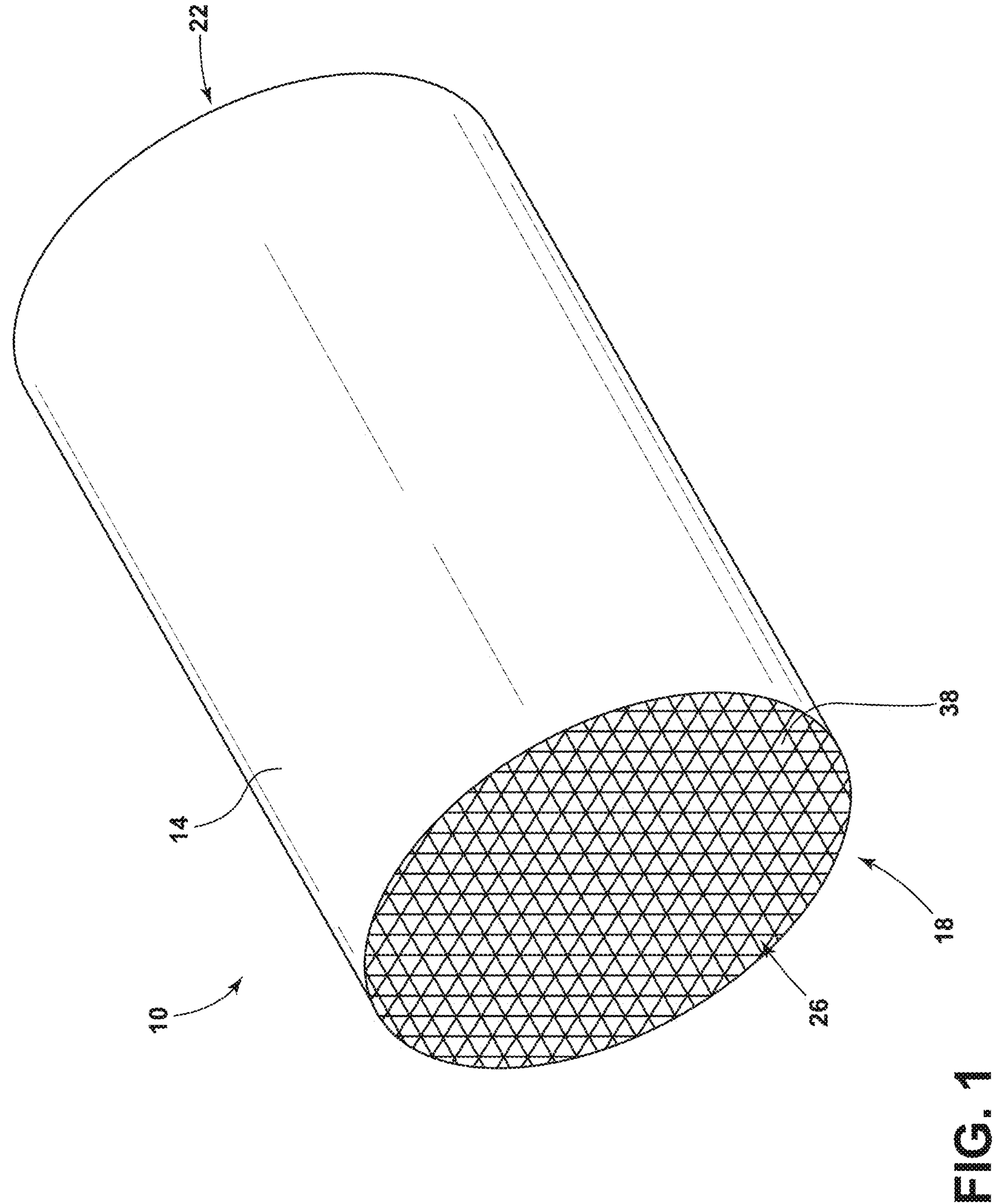
FIG. 1 is a perspective view of a particulate filter, illustrating a porous cellular body with intersecting walls that form a plurality of channels open at a first end.
Figure 2:
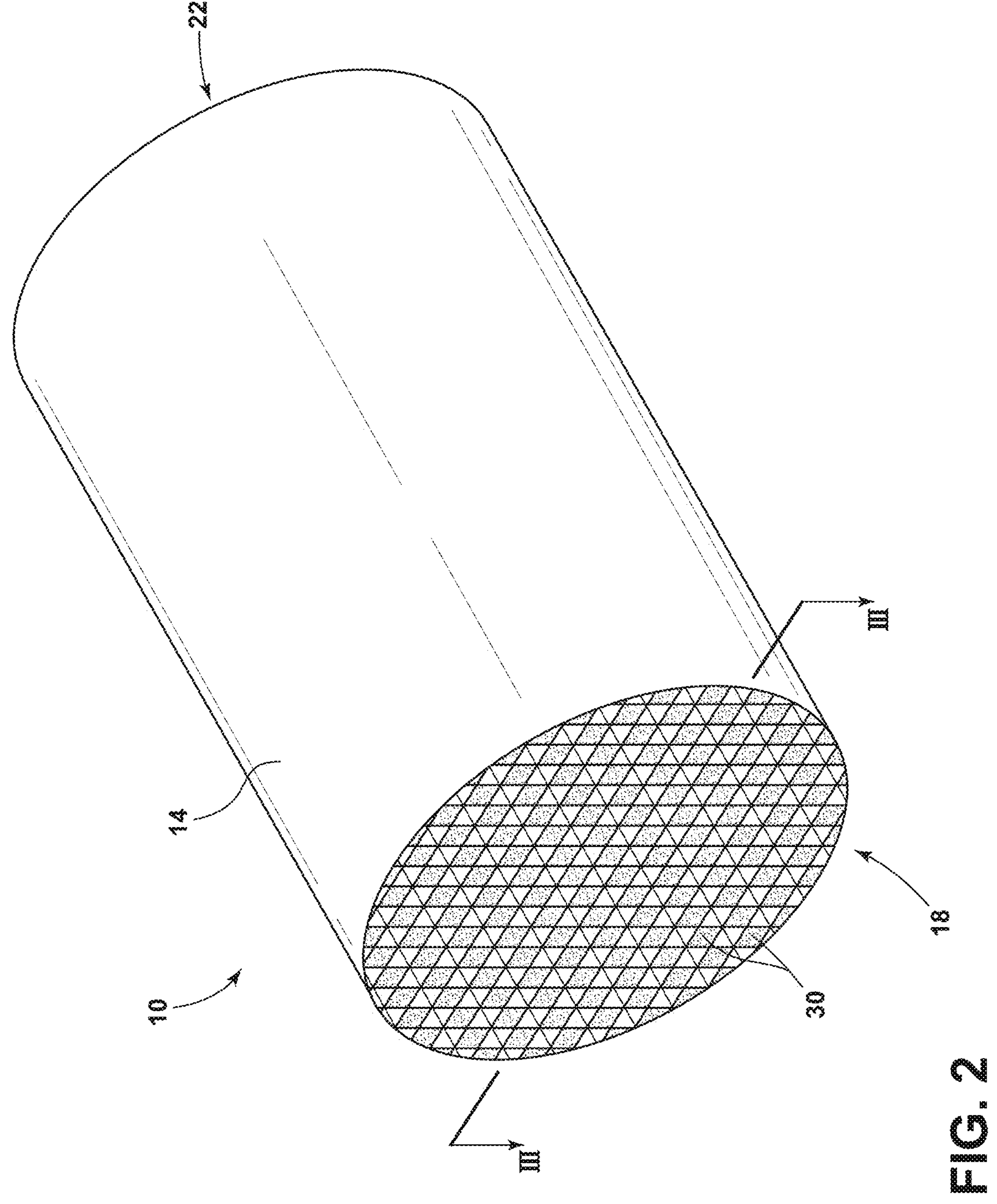
FIG. 2 is a perspective view of the particulate filter of FIG. 1 but with plugs plugging a portion of the plurality of channels.
Figure 3:
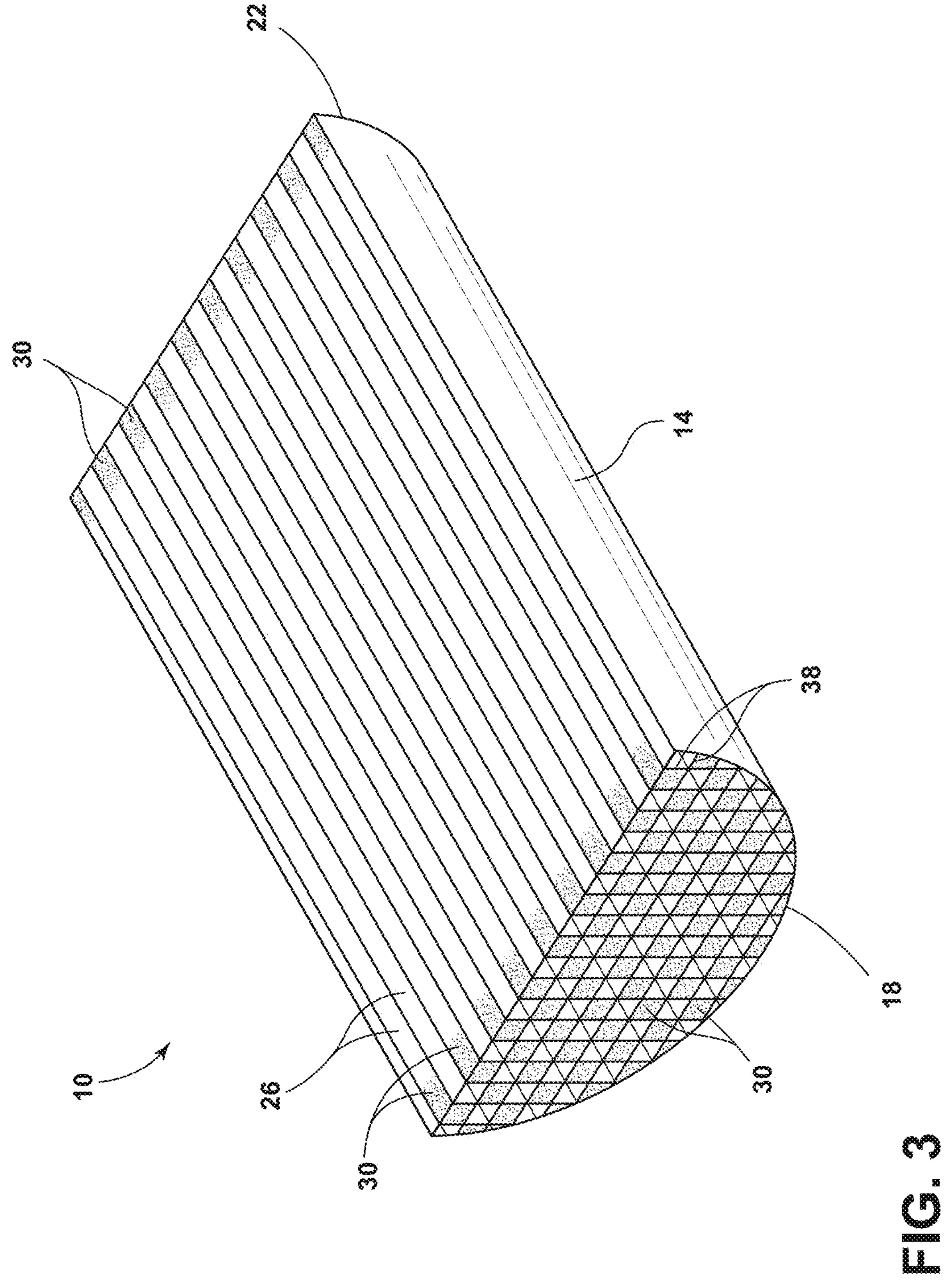
FIG. 3 is a perspective view of the cross-section of the particulate filter of FIG. 2 taken along line III-III of FIG. 2, illustrating the plugs extending into various of the channels at the first end and a second end, in an alternating pattern.

Filter with a Porous Cellular Body and a Plurality of Plugs in a Plurality of Channels Referring to FIGS. 1-3, a filter 10 includes a porous cellular body 14 comprising a first end 18 and a second end 22. The porous cellular body 14 comprises intersecting walls 38. The intersecting walls 38 can be thin and are porous and permeable. The walls 38 may have a thickness in mils (i.e., thousandths of an inch) of from about 1 mil to about 15 mils, or from about 1 mil to about 14 mils, or from about 1 mil to about 13 mils, or from about 1 mil to about 12 mils, or from about 1 mil to about 11 mils, or from about 1 mil to about 10 mils, or from about 1 mil to about 9 mils, or from about 1 mil to about 8 mils, or from about 1 mil to about 7 mils, or from about 1 mil to about 6 mils, or from about 1 mil to about 5 mils, or from about 1 mil to about 4 mils, or from about 1 mil to about 3 mils, or from about 1 mil to about 2 mils, or any and all values and ranges therebetween.

The intersecting walls 38 extend across and between the first and second ends 18, 22 to form a large number of adjoining channels 26. The channels 26 extend between, and are open at, the first and second ends 18, 22 of the porous cellular body 14. According to various examples, the channels 26 are mutually parallel with one another. It will be understood that although the channels 26 are depicted with a generally square cross-sectional shape, the channels 26 may have a circular, triangular, rectangular, pentagonal, or higher order polygon cross-sectional shape without departing from the teachings provided herein. Each of the channels 26 has a hydraulic diameter $d_h$. Hydraulic diameter is defined as:

$$d_h = \frac{4A}{P}$$

where, A is the cross-sectional area of the channel 26, and P is the length of the wetted perimeter of the channel 26 (i.e., the length of the perimeter of the channel 26 in contact with the plugging mixture, described below). In the case of generally square cross-section channels 26, the hydraulic diameter $d_h$ is the width of the channel 26, i.e., the distance between the opposing walls 38. In the case of generally circular cross-section channels 26, the hydraulic diameter $d_h$ is just that—the diameter of the channel 26. Adjacent channels 26 may have different hydraulic diameters $d_h$. In general, the channels 26 chosen to be plugged as described below will have approximately the same hydraulic diameter $d_h$.

The porous cellular body 14 may comprise a transverse cross-sectional channel density of from about 10 channels/in$^2$ to about 900 channels/in$^2$, or from about 100 channels/in$^2$ to about 900 channels/in$^2$, or from about 20 channels/in$^2$ to about 800 channels/in$^2$, or from about 30 channels/in$^2$ to about 700 channels/in$^2$, or from about 40 channels/in$^2$ to about 600 channels/in$^2$, or from about 50 channels/in$^2$ to about 500 channels/in$^2$, or from about 60 channels/in$^2$ to about 400 channels/in$^2$, or from about 70 channels/in$^2$ to about 300 channels/in$^2$, or from about 80 channels/in$^2$ to about 200 channels/in$^2$, or from about 90 channels/in$^2$ to about 100 channels/in$^2$, or from about 100 channels/in$^2$ to about 200 channels/in$^2$, or from about 200 channels/in$^2$ to about 300 channels/in$^2$, or any and all values and ranges therebetween.

The porous cellular body 14 may be formed of a variety of materials including ceramics, glass-ceramics, glasses, metals, and by a variety of methods depending upon the material selected. According to various examples, a green body which is transformed into the porous cellular body 14 may be initially fabricated from plastically formable and sinterable finely divided particles of substances that yield a porous material after being fired. Suitable materials for a green body which is formed into the porous cellular body 14 comprise metallics, ceramics, glass-ceramics, and other ceramic based mixtures. In some embodiments, the porous cellular body 14 is comprised of a cordierite (e.g., $2MgO \cdot 2Al_2O_3 \cdot 5SiO_2$) material.

The filter 10 further includes a plurality of plugs 30 positioned within at least some of the channels 26, in some embodiments at the first and second ends 18, 22, of the porous cellular body 14. For example, a portion of the plugs 30 close a first subset of channels 26 at the first end 18, and another portion of the plugs 30 close a second subset of channels 26 (different than the first subset of channels 26, such as in an alternating manner) at the second end 22 of the porous cellular body 14. As mentioned above, adjacent channels 26 may have a different hydraulic diameter $d_h$, such that the channels 26 receiving the plugs 30 at the first end 18 have a smaller hydraulic diameter $d_h$, and the channels 26 receiving the plugs 30 at the second end 22 have a larger hydraulic diameter $d_h$. In such an arrangement, the first end 18 of the filter 10 is the fluid inlet, and the second end 22 of the filter 10 is the fluid outlet.

The plugs 30 may have an axial length, or longest dimension extending substantially parallel with the channels 26, of about 0.5 mm or greater, of about 1 mm or greater, of about 1.5 mm or greater, of about 2 mm or greater, of about 2.5 mm or greater, of about 3 mm or greater, of about 3.5 mm or greater, of about 4 mm or greater, of about 4.5 mm or greater, of about 5 mm or greater, of about 5.5 mm or greater, of about 6.0 mm or greater, of about 6.5 mm or greater, of about 7.0 mm or greater, of about 7.5 mm or greater, of about 8.0 mm or greater, of about 8.5 mm or greater, of about 9.0 mm or greater, of about 9.5 mm or greater, of about 10.0 mm or greater, or about 15 mm or greater. For example, the plugs 30 may have an axial length of from about 0.5 mm to about 10 mm, or from about 1 mm to about 9 mm, or from about 1 mm to about 8 mm, or from about 1 mm to about 7 mm, or from about 1 mm to about 6 mm, or from about 1 mm to about 5 mm, or from about 1 mm to about 4 mm, or from about 1 mm to about 3 mm, or from about 1 mm to about 2 mm, or any and all value and ranges therebetween. According to various examples, the plurality of plugs 30 located on the first end 18 of the body 14 may have a different length than the plugs 30 positioned on the second end 22 of the body 14.

In operation of the filter 10, fluids such as gases carrying solid particulates are brought under pressure to the inlet face (e.g., the first end 18). The gases then enter the porous cellular body 14 via the channels 26 that are open (not plugged with one of the plugs 30) at the first end 18, pass through the intersecting walls 38 of the porous cellular body 14, and out the channels 26 which have an open end at the second end 22. Passing of the fluid through the walls 38 may allow the particulate matter in the fluid to remain trapped by the walls 38. In the depicted example, the plugs 30 are positioned across the first and second ends 18, 22 of the porous cellular body 14 in a "checkerboard" pattern, but it will be understood that other patterns may also be applied. In the checkerboard pattern, each of an open channel's 26 nearest neighbor channels 26 on an end (e.g., either the first or second end 18, 22) includes a plug 30.

Figure 4:
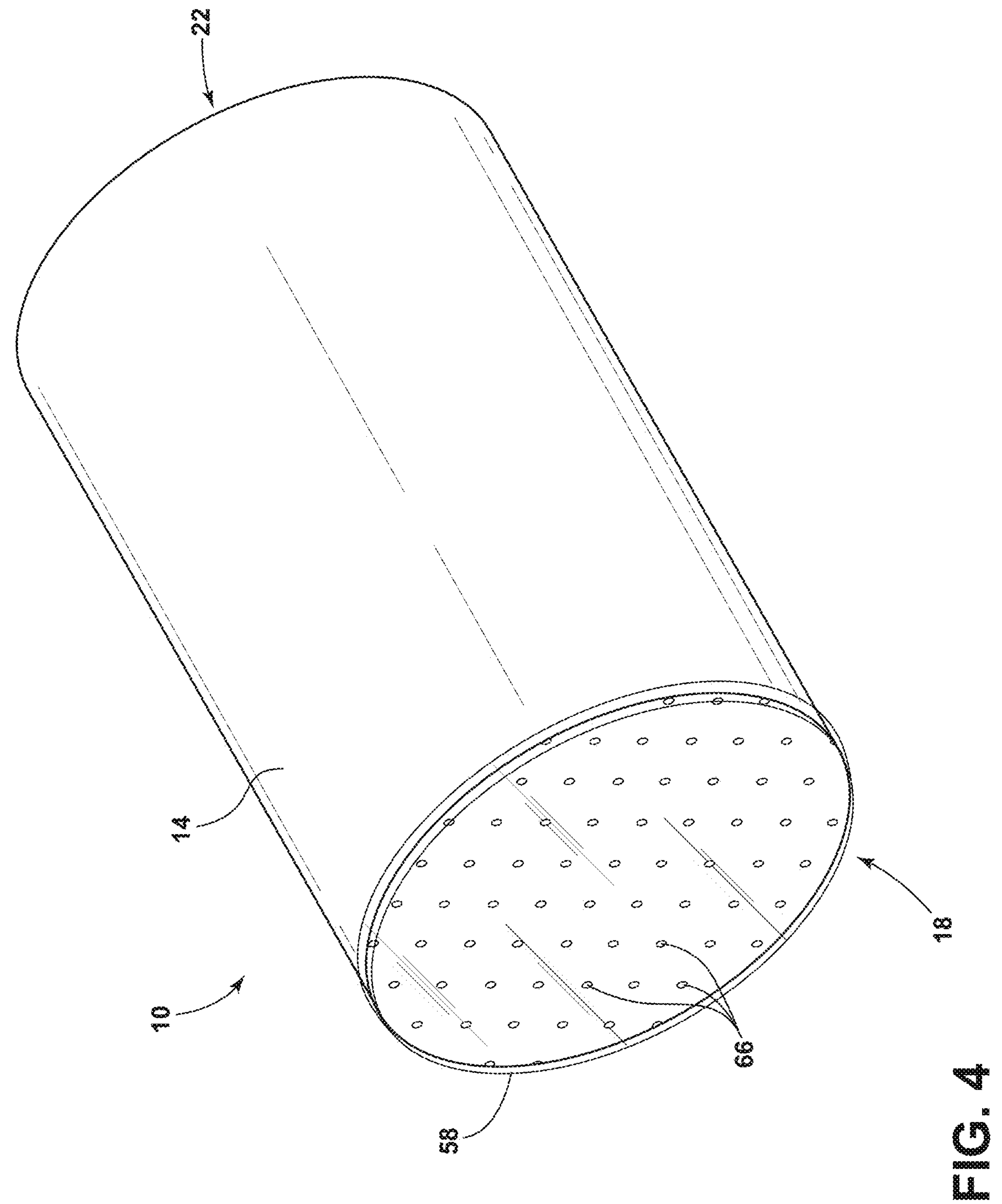
FIG. 4 is a perspective view of the particulate filter of FIG. 1, but with a mask layer covering the first end, illustrating the mask layer having a plurality of holes.

Referring now to FIG. 4, the filter 10 may be formed using a mask layer 58 across the first end 18 of the porous cellular body 14 to cover a portion of the plurality of channels 26. The mask layer 58 may be comprised of a metal, a polymeric material, a composite material. and/or combinations thereof. The mask layer 58 may be comprised of a rice paper, cellophane, Plexiglas®, biaxially-oriented polyethylene terephthalate, other materials, and/or combinations thereof. The mask layer 58 can be positioned on the first and/or second ends 18, 22 of the honeycomb body 14. The mask layer 58 may cover a portion, a majority, substantially all, or all of the first and/or second ends 18, 22. The mask layer 58 may have the same size and shape as the first and/or second ends 18, 22, or the size and/or shape of the mask layer 58 may be different. For example, the mask layer 58 may have the same general shape as a cross-section of the porous cellular body 14 (e.g., generally circular) and may have a greater diameter than the porous cellular body 14 such that the mask layer 58 extends radially outwardly from the porous cellular body 14. The mask layer 58 may extend outwardly from the porous cellular body 14 about 0.5 cm or greater, about 1.0 cm or greater, about 1.5 cm or greater, about 2.0 cm or greater, about 2.5 cm or greater, about 3.0 cm or greater, about 3.5 cm or greater, about 4.0 cm or greater, about 4.5 cm or greater, about 5.0 cm or greater, about 5.5 cm or greater, about 6.0 cm or greater, or any and all values and ranges therebetween. The mask layer 58 may be coupled to the porous cellular body 14. For example, the porous cellular body 14 and/or the mask layer 58 may have an adhesive adhered thereto, or disposed between, to allow sticking of the mask layer 58 to the porous cellular body 14. In another example, a band may be positioned around an exterior surface of the porous cellular body 14 to retain the mask layer 58 to the porous cellular body 14. According to various examples, the mask layer 58 may define a plurality of holes 66.

Method of Plugging the Porous Cellular Body to Form the Plugs

Figure 5:
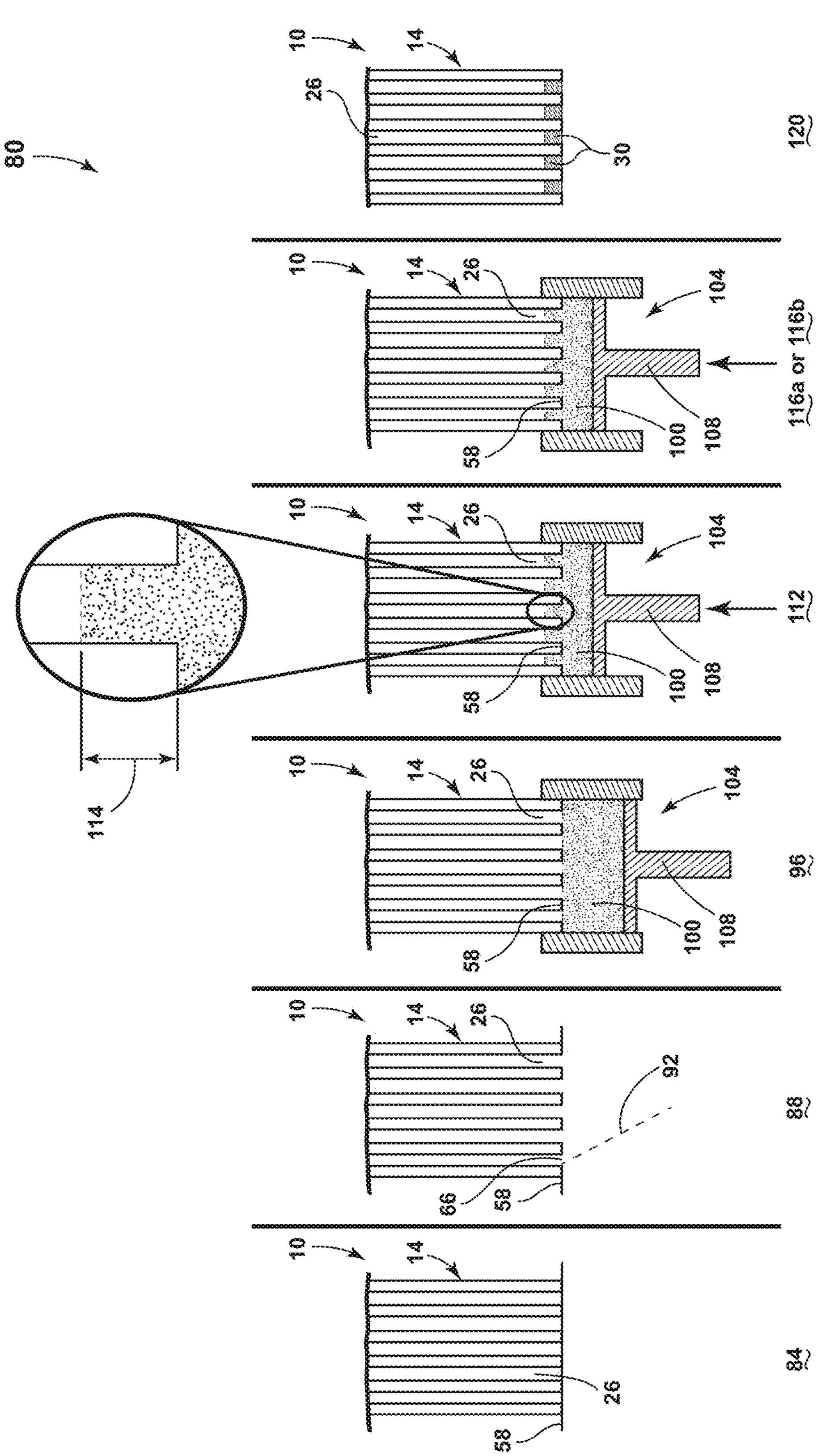
FIG. 5 is a schematic flowchart of a method of plugging various of the channels of the particulate filter of FIG. 1, illustrating steps of positioning the mask layer over the porous cellular body, perforating the mask layer, contacting the porous cellular body with a plugging mixture, forcing the plugging mixture into various of the plurality of channels until a maximum, self-limiting, depth of plugging mixture is disposed within those channels, and either: (a) applying a constant pressure on the plugging mixture until the flow rate decays to a predetermined flow rate; or (b) maintaining a constant flow rate until the pressure elevates to a predetermined pressure.

Referring now to FIG. 5, depicted is a schematic method 80 of plugging the porous cellular body 14 of the filter 10.

Positioning Mask Layer. The method 80 may begin with an optional preliminary step 84 of positioning the mask layer 58 over the porous cellular body 14 including the plurality of intersecting walls 38 that define at least one channel 26 between the intersecting walls 38. As explained above, the mask layer 58 may be coupled to the porous cellular body 14 through the use of an adhesive to allow sticking of the mask layer 58 to the porous cellular body 14 and/or through the use of a band positioned around an exterior surface of the porous cellular body 14 to retain the mask layer 58 to the porous cellular body 14.

Perforating Mask Layer. The method 80 further includes, at step 88, a further optional preliminary step of perforating portions of the mask layer 58 that cover the channels 26 to be plugged with the plug 30 to form the holes 66 allowing access into those channels 26. Perforating the mask layer 58 to form the holes 66 in the mask layer 58 facilitates material transfer into the channel 26 from an environment on the other side of the mask layer 58. The hole 66 may be formed through mechanical force (e.g., with a punch) or by utilizing a laser 92. According to various examples, the mask layer 58 may include a plurality of holes 66 positioned across the mask layer 58. For example, the holes 66 may be positioned in a pattern (e.g., a checkerboard-like pattern) across the mask layer 58. In checkerboard-like patterns, the holes 66 are positioned over every other channel 26 at a face (e.g., the first and/or second ends 18, 22). The result is a plurality of holes 66 through the mask layer 58 that are positioned over a plurality of the channels 26.

Contacting Porous Body With Plugging Mixture. The method 80 further includes, at step 96, contacting the porous cellular body 14 with a plugging mixture 100. In step 96, the porous cellular body 14 and its plurality of channels 26 through the mask layer 58 is brought into contact within the plugging mixture 100. In the depicted example, the porous cellular body 14 is coupled to a plugging system 104 including a plunger 108 to apply pressure to the plugging mixture 100. As explained above, the mask layer 58 is disposed on at least one end of the porous cellular body 14. The end of the porous cellular body 14 with the mask layer 58 is positioned to contact the plugging mixture 100 such that the plugging mixture 100 may later flow through the holes 66 and into the channels 26.

The plugging mixture 100 may be composed of an organic binder, an inorganic binder, water, and/or a plurality of inorganic particles. According to various examples, the plugging mixture 100 may include one or more additives (e.g., viscosity or rheology modifiers, plasticizers, organic binders, foaming agents, a pore former, etc.). The inorganic binder may take the form of silica, alumina, other inorganic binders, and combinations thereof. The silica may take the form of fine amorphous, nonporous, and generally spherical silica particles. At least one commercial example of suitable colloidal silica for the manufacture of the plugs 30 is produced under the name Ludox®. The organic binder can be methylcellulose.

The inorganic particles of the plugging mixture 100 may be comprised of glass material, ceramic material such as cordierite, mullite, silica, alumina, or aluminum titanate, glass-ceramic material, and/or combinations thereof. In some embodiments, the inorganic particles may have the same or a similar composition to that of the green body that is used to produce the porous cellular body 14. In some embodiments, the inorganic particles comprise cordierite or cordierite forming precursor materials which, upon reactive sintering or sintering, form a porous ceramic structure for the plugs 30. Depending on the particle size distribution of the inorganic particles, the inorganic particles may have a weight percentage in the plugging mixture 100 of from about 45% to about 80%, or from 50% to about 70%. For example, the inorganic particles may have a weight percentage in the plugging mixture 100 of about 50%, about 52%, about 54%, about 56%, about 58%, about 60%, about 62%, about 62.5%, about 63%, about 64%, about 66%, about 68%, about 70%, or any and all values and ranges therebetween.

The inorganic binder may have a weight percentage in the plugging mixture 100 of from about 10% to about 35%, or from about 10% to about 30%, or from about 10% to about 29%, or from about 10% to about 28%, or from about 10% to about 27%, or from about 10% to about 26%, or from about 10% to about 25%, or from about 10% to about 24%, or from about 10% to about 23%, or from about 10% to about 22%, or from about 10% to about 21%, or from about 10% to about 20%, or from about 10% to about 19%, or from about 10% to about 18%, or from about 10% to about 17%, or from about 10% to about 16%, or from about 10% to about 15%. For example, the inorganic binder may have a weight percentage in the plugging mixture 100 of about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, or any and all values and ranges therebetween.

The plugging mixture 100 may have sufficient water that the plugging mixture 100 may be viscous or flow. The plugging mixture 100 may comprise a weight percentage of water from about 5% to about 40% water, or from about 10% to about 25%, or from about 10% to about 24%, or from about 10% to about 23%, or from about 10% to about 22%, or from about 10% to about 21%, or from about 10% to about 20%, or from about 10% to about 19%, or from about 10% to about 18%, or from about 10% to about 17%, or from about 10% to about 16%, or from about 10% to about 15%, or from about 10% to about 14%, or from about 10% to about 13%, or from about 10% to about 12%, or from about 10% to about 11%. For example, the water may have a weight percentage in the plugging mixture 100 of about 10%, about 12%, about 14%, about 16%, about 18%, about 19%, about 20%, about 22%, about 24%, about 26%, about 28%, about 30%, about 31%, about 32%, about 33%, about 34%, about 35%, about 40%, or any and all values and ranges therebetween.

As mentioned, the plugging mixture 100 may include one or more viscosity or rheology modifiers as additive(s). For example, the plugging mixture 100 may include a polymer or a cellulose ether such as Methocel® A4M. The plugging mixture 100 may have a weight percent of viscosity modifier of about 0.10%, or about 0.20%, about 0.30%, about 0.40%, about 0.50%, about 0.60%, about 0.70%, about 0.80%, about 0.90%, about 1.00%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, or about 3.9% or about 4.0%, or any and all values and ranges therebetween.

The volumetric solids loading within the plugging mixture 100 (i.e., the total percentage by volume of the solids component of the plugging mixture 100 in the water) may be about 30%, or about 31%, or about 32%, or about 33%, or about 34%, or about 35%, or about 36%, or about 37%, or about 38%, or about 39%, or about 40%, or about 41%, or about 42%, or about 43%, or about 44%, or about 45%, or about 46%, or about 47%, or about 48%, or about 49%, or about 50%, or about 51%, or about 52%, or about 53%, or about 54%, or about 55%, or about 56%, or about 57%, or about 58%, or about 59%, or about 60%, or any and all values and ranges with any of the given values as end points. For example, the volumetric solids loading within the water of the plugging mixture 100 may be from about 30% to about 60%, or from about 40% to about 50%, or from about 44% to about 47%, or from about 45% to about 47%, or from about 45.5% to about 46.7%.

Forcing Plugging Mixture Into Channels. Once the porous cellular body 14 is in contact with the plugging mixture 100 from step 96, the method 80 further includes, at step 112, forcing the plugging mixture 100 into the plurality of channels 26 until a maximum, self-limiting, depth 114 of the plugging mixture 100 is disposed within the channels 26. The depth 114 is a maximum, self-limiting, depth to the extent that, once the depth 114 is achieved, additional force that the plunger 108 applies on the plugging mixture 100 will not result in the plugging mixture 100 extending further into the channels 26 than the depth 114. Without being bound by theory, the depth 114 of the plugging mixture 100 being forced into the channels 26 is self-limiting because liquid of the plugging mixture 100 leaves the plugging mixture 100 and enters adjacent intersecting walls 38 of the permeable porous cellular body 14. As the fluid of the plugging mixture 100 passes into the intersecting walls 38, the solids of the plugging mixture 100 agglomerate and pack together. These solids resist further flow into the channel 26 and the maximum, self-limiting, depth 114 is thus achieved.

Application of Constant Flow Rate or Constant Pressure. The method 80 further includes either step 116*a* or step 116*b*. In embodiments of the method 80, step 112 of forcing the plugging mixture 100 into the plurality of channels 26 until a maximum, self-limiting, depth 114 of the plugging mixture 100 is disposed within the channels 26 includes forcing the plugging mixture 100 into the plurality of channels 26 utilizing application of a constant pressure over time until the maximum, self-limiting, depth 114 of the plugging mixture 100 is disposed within the plurality of channels 26. In those embodiments, the method 80 further includes, at step 116*a*, maintaining the constant pressure applied to the plugging mixture 100 until the flow of the plugging mixture 100 into the plurality of channels 26 decays from an initial flow rate to a predetermined flow rate.

In other embodiments of the method 80, the method 80 further includes, at step 116*b* (instead of step 116*a*), maintaining a constant flow rate of the plugging mixture 100 into the channels 26 until a pressure on the plugging mixture 100 elevates to a predetermined pressure. In either instance (step 116*a* or step 116*b*), although the plugging mixture 100 cannot extend into the channels 26 beyond the depth 114, some plugging mixture 100 continues to enter the channels 26 to replace the liquid that left the previously injected plugging mixture 100 to enter the permeable porous intersecting walls 38. This additional plugging mixture 100, added during step 116*a* or step 116*b*, fills any voids and prevents any dimples from forming.

In step 116*a*, as mentioned, the plunger 108 maintains a constant pressure on the plugging mixture 100 until a flow rate of the plugging mixture 100 decays to a predetermined (non-zero) flow rate. The moment the constant pressure on the plugging mixture 100 is initiated, the constant pressure causes the plugging mixture 100 to flow into the channels 26 at an initial flow rate, which can already be in a state of decay. When the flow rate decays to below a predetermined flow rate, the constant pressure upon the plugging mixture 100 ceases. The flow rate of the plugging mixture 100 may be indirectly approximated by the displacement of the plunger 108. In other words, the rate of displacement of the plunger 108 is faster at the beginning of step 112 and lower near the end of step 116*a*. Accordingly, when the rate of displacement of the plunger 108 decays to below a predetermined rate of displacement, the constant pressure upon the plugging mixture 100 ceases.

The constant pressure for step 116*a* is as constant as real-world conditions permit. The constant pressure can be about 1 psi, about 5 psi, about 10 psi, or about 15 psi, or about 20 psi, or about 25 psi, or about 30 psi, or about 35 psi, or about 40 psi, or about 45 psi, or about 50 psi, or about 55 psi, or about 60 psi, or about 65 psi, or about 70 psi, or about 75 psi, or about 80 psi, or about 85 psi, or about 90 psi, or about 95 psi, or about 100 psi, or about 105 psi, or about 110 psi, or about 115 psi, or about 120 psi, or any and all values and ranges between the given values. Such ranges include a constant pressure of from about 1 psi to about 50 psi, including from about 15 psi to about 40 psi. The predetermined flow rate can be about 50% or less, or about 45% or less, or about 40% or less, or about 35% or less, or about 30% or less, or about 25% or less, or about 20% or less, or about 15% or less, or about 10% or less, or about 5% or less, or about 1%, or less than the initial flow rate. It will be understood that any and all values and ranges extending from any of the given values is contemplated.

In step 116*b*, as mentioned, the plunger 108 maintains a constant flow rate of the plugging mixture 100 into the channels 26 until a pressure on the plugging mixture 100 elevates to a predetermined pressure. In other words, the constant flow rate of the plugging mixture 100 into the channels 26 begins during step 112 and, after the plugging mixture 100 achieves the self-limiting, maximum depth 114 and resists further flow of plugging mixture 100 into the channels 26, the pressure on the plugging mixture 100 must rise to maintain the constant flow rate. Eventually, during step 116*b*, the pressure elevates to the predetermined pressure and the plugging operation ceases. Again, the flow rate of the plugging mixture 100 may be indirectly approximated by the displacement of the plunger 108. The predetermined pressure may be about 5 psi, or about 10 psi, or about 15 psi, or about 20 psi, or about 25 psi, or about 30 psi, or about 35 psi, or about 40 psi, or about 45 psi, or about 50 psi, or about 55 psi, or about 60 psi, or about 65 psi, or about 70 psi, or about 75 psi, or about 80 psi, or about 85 psi, or about 90 psi, or about 95 psi, or about 100 psi, or about 105 psi, or about 110 psi, or about 115 psi, or about 120 psi, or any and all values and ranges between the given values. Such ranges for the predetermined pressure include from about 20 psi to about 50 psi.

Heating the Plugging Mixture to Form Plugs. The method 80 further includes, at step 120, heating the plugging mixture 100 to form the plugs 30 within the channels 26. Once the porous cellular body 14 is disengaged from the plugging mixture 100, the mask layer 58 may be removed. The porous cellular body 14 is then heated to sinter the plugging mixture 100 and thus form the plurality of plugs 30. The time and temperature of step 120 may vary depending on the composition of the plugging mixture 100 as well as other factors. In general however, sintering of the plugging mixture 100 to form the plurality of plugs 30 occurs at a temperature of from about 800° C. to about 1500° C. For example, sintering of the plugging mixture 100 can occur at about 800° C., about 900° C., about 1,000° C., about 1,100° C., about 1,200° C., about 1,300° C., about 1,400° C., about 1,500° C., or any and all values and ranges therebetween. Sintering of the plugging mixture 100 can result in the plugs 30 having a length that is equal to or less than the maximum, self-limiting, depth 114 of the plugging mixture 100 forced into the channels 26.

In embodiments, step 120 of heating of the porous cellular body 14 further includes, before heating the plugging mixture 100 in the permeable porous cellular body 14 to form a plurality of plugs, heating the plugging mixture 100 in the permeable porous cellular body 14: (a) to dry the plugging mixture 100 (drying the plugging mixture 100 sets the plugging mixture 100 within the channels 26); or (b) to remove organic binder (calcining) from the plugging mixture 100; or (c) both (a) and (b). In general, calcining of the porous cellular body 14 occurs at a temperature of from about 350° C. to about 600° C. For example, calcining can occur at about 350° C., about 400° C., about 450° C., about 500° C., about 550° C., about 600° C., or any and all values and ranges therebetween.

Before the method 80 of the present disclosure, a volume of the plugging mixture 100 insufficient to achieve the maximum, self-limiting, depth 114 was utilized. In other words, prior methods of forming the plugs 30 of the filter 10 utilized a fixed volume of the plugging mixture 100 to achieve a certain target depth 114 into the channels 26 that was less than the maximum, self-limiting, depth 114. In any event, the absorption of liquid from the plugging mixture 100 into the intersecting walls 38 left voids and dimples after the plugging mixture 100 was formed into the plugs 30.

The method 80 of the present disclosure is advantageous over the prior methods. The maximum, self-limiting, depth 114 still provides a certain consistent depth 114 across the channels 26. Unlike the prior attempts, the method 80 results in plugs 30 that are substantially free of dimples and voids. As mentioned, in steps 116*a*, 116*b*, the plugging mixture 100 replaces liquid that the intersecting walls 38 withdraws from the plugging mixture 100 and forces out gas present in the plugging mixture 100 within the channels 26, so as to prevent the formation of, or eliminate, voids within the plugging mixture 100 disposed within the channels 26.

Variables Affecting the Maximum, Self-Limiting, Depth

The maximum, self-limiting, depth 114 is a function of a variety of variables. Adjusting these variables above alters the maximum, self-limiting, depth 114, and thus the depth 114 is just as tunable as with prior methods.

Level of Applied Constant Pressure or Constant Flow Rate. The maximum, self-limiting, depth 114 is a function of the level of constant pressure applied to the plugging mixture 100 during step 116*a* of the method 80 above, and the level of the constant flow rate at which the plugging mixture 100 is forced into the plurality of channels 26 during step 116*b* of the method 80 above. For example, increasing the constant pressure or increasing the constant flow rate at steps 116*a*, 116*b* respectively increases the maximum, self-limiting, depth 114. In contrast, decreasing the constant pressure or decreasing the constant flow rate at steps 116*a*, 116*b* respectively decreases the maximum, self-limiting, depth 114.

Hydraulic Diameter of the Channels of the Porous Cellular Body. The maximum, self-limiting, depth 114 is a function of the hydraulic diameter $d_h$ of the plurality of channels 26 of the porous cellular body 14 into which the plugging mixture 100 is forced to form the plugs 30. For example, increasing the hydraulic diameter $d_h$ increases the maximum, self-limiting, depth 114. In contrast, decreasing the hydraulic diameter $d_h$ decreases the maximum, self-limiting, depth 114.

Absorptive Capacity of the Porous Cellular Body. The maximum, self-limiting, depth 114 is additionally a function of absorptive capacity of the porous cellular body 14. For example, presoaking the porous cellular body 14 in a liquid (e.g., water) decreases the ability of the intersecting walls 38 to absorb the liquid of the plugging mixture 100 and, thus, increases the maximum, self-limiting, depth 114. In another example, contacting the channels 26 of the porous cellular body 14 at the first and/or second ends 18, 22 with a hydrophobic coating (such as by immersion or spraying) inhibits capillary action that draws fluid from the plugging mixture 100 into the intersecting walls 38 of the channels 26, and thus increases the maximum, self-limiting, depth 114. Stated another way, the hydrophobic coating decreases the rate of viscosity change of the plugging mixture 100 as the plugging mixture 100 flows into the channels 26 and the intersecting walls 38 absorb liquid from the plugging mixture 100.

Permeability of the Inorganic Particles. The maximum, self-limiting, depth 114 is additionally a function of the permeability of the inorganic particles of the plugging mixture 100. For example, decreasing the permeability of the inorganic particles of the plugging mixture 100 increases the maximum, self-limiting, depth 114. In turn, decreasing the average particle size of the inorganic particles with a fixed particle size distribution breadth, or broadening the particle size distribution of the inorganic particles at the same average particle size, decreases the permeability of the inorganic particles of the plugging mixture 100. In contrast, increasing the permeability of the inorganic particles of the plugging mixture 100 decreases the maximum, self-limiting, depth 114. In turn, increasing the average particle size of the inorganic particles with a fixed particle size distribution breadth, or narrowing the particle size distribution of the inorganic particles at the same average particle size, increases the permeability of the inorganic particles of the plugging mixture 100. These changes can be accomplished through changes to a single inorganic material or through the blending of two separate inorganic materials that have different average particle size and/or different particle size distribution breadths. The shape of the inorganic particles additionally can affect the permeability of the inorganic particles.

Viscosity of the Liquid in the Plugging Mixture. The maximum, self-limiting, depth 114 is additionally a function of the viscosity of the liquid of the plugging mixture 100. For example, increasing the viscosity of the liquid in the plugging mixture 100 at a fixed viscosity of the plugging mixture 100 increases the maximum, self-limiting, depth 114. This can be achieved by increasing the concentration of polymer (organic binder) within the plugging mixture 100 and decreasing the volumetric solids loading. In contrast, decreasing the viscosity of the liquid in the plugging mixture 100 at a fixed viscosity of the plugging mixture 100 decreases the maximum, self-limiting, depth 114. This can be achieved by decreasing the concentration of polymer (organic binder) within the plugging mixture 100 and increasing the volumetric solids loading.

Viscosity of the Plugging Mixture. The maximum, self-limiting, depth 114 is additionally a function of the viscosity of the plugging mixture 100 as a whole. For example, lowering the viscosity of the plugging mixture 100 at a fixed liquid viscosity increases the maximum, self-limiting, depth 114. In turn, decreasing the volumetric solids loading lowers the viscosity of the plugging mixture 100 at a fixed liquid viscosity. In contrast, increasing the viscosity of the plugging mixture 100 at a fixed liquid viscosity decreases the maximum, self-limiting, depth 114. For example, increasing the volumetric solids loading increases the viscosity of the plugging mixture 100 at a fixed liquid viscosity.

Another Method of Plugging the Porous Cellular Body to Form the Plugs

Figure 14:
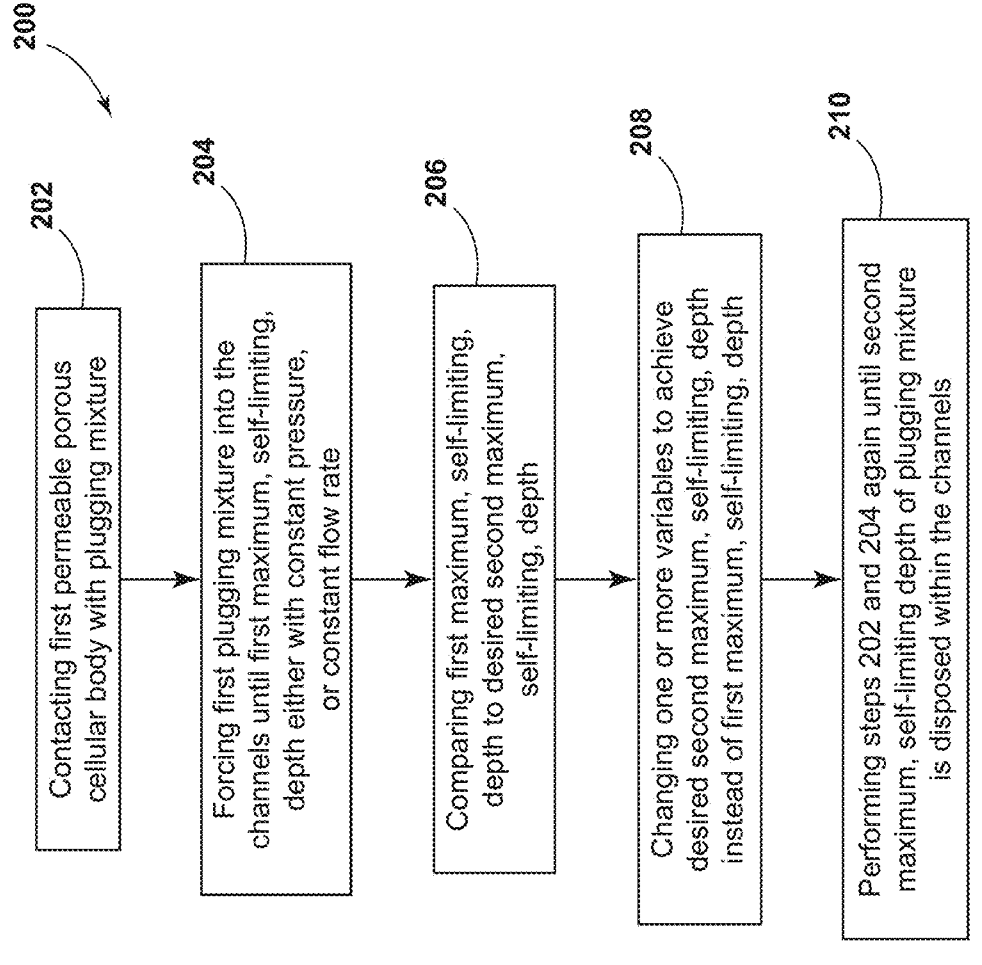
FIG. 14 is a schematic flowchart of another method of plugging a permeable porous cellular body to a desired maximum, self-limiting, depth, illustrating that variables can be manipulated after achieving a first maximum, self-limiting, depth in order to achieve a desired second maximum, self-limiting, depth.

Referring now to FIG. 14, further described herein is a novel method 200 of plugging a permeable porous cellular body 14 to a desired maximum, self-limiting, depth 114'. The method 200, at step 202, comprises contacting a permeable porous cellular body 14 with a plugging mixture 100. The permeable porous cellular body 14 defines a plurality of channels 26, as explained above.

The method 200, at step 204, further comprises either performing step 116*a* or step 116*b* of the method 80 described above. In other words, the method 200 at step 204 further comprises either (i) forcing the plugging mixture 100 into the plurality of channels 26 at a first constant flow rate until a first maximum, self-limiting, depth 114 of the plugging mixture 100 is disposed within the plurality of channels 26, and maintaining the first constant flow rate of the plugging mixture 100 into the plurality of channels 26 until a pressure on the plugging mixture 100 elevates to a predetermined pressure, or (ii) forcing the plugging mixture 100 into the plurality of channels 26 at a first constant pressure until a first maximum, self-limiting, depth of plugging mixture 100 is disposed within the plurality of channels 26 and maintaining the first constant pressure applied to the plugging mixture 100 until flow of the plugging mixture 100 into the plurality of channels 26 decays from an initial flow rate to a predetermined flow rate. In any event, step 204 results in the plugging mixture 100 extending into the channels 26 to a first maximum, self-limiting, depth 114.

The method 200, at step 206, further comprises comparing the first maximum, self-limiting, depth 114 to a desired second maximum, self-limiting, depth 114'. The first maximum, self-limiting, depth 114 may be deeper or shallower than the desired maximum, self-limiting, depth 114.

The method 200, at step 208, further comprises changing one or more of the variables described above so that the desired second maximum, self-limiting, depth 114' can be achieved instead of the first maximum, self-limiting, depth 114. In other words, step 208 includes changing one or more of the following: (i) the first constant pressure to a second constant pressure; (ii) the first constant flow rate to a second constant flow rate; (iii) a first hydraulic diameter $d_h$ of the plurality of channels 26 to a second hydraulic diameter $d_h$; (iv) a first absorptive capacity of the porous cellular body 14 to a second absorptive capacity; (v) a first permeability of inorganic particles within the plugging mixture 100 to a second permeability; (vi) a first viscosity of liquid in the plugging mixture 100 to a second viscosity while maintaining approximately the same overall viscosity of the plugging mixture 100; (vii) a first viscosity of the plugging mixture 100 to a second viscosity while maintaining approximately the same viscosity of liquid in the plugging mixture 100.

The method 200, at step 210, further comprises performing steps 202 and 204 again until the second maximum, self-limiting depth 114' of the plugging mixture 100 is disposed within the plurality of channels 26.

In embodiments, the second maximum, self-limiting, depth 114' of the plugging mixture 100 is deeper than the first maximum, self-limiting, depth 114'. In embodiments, to achieve the deeper second maximum, self-limiting, depth 114', the second constant pressure is higher than the first constant pressure that resulted in the first maximum, self-limiting, depth 114'. In embodiments, to achieve the deeper second maximum, self-limiting, depth 114', the second constant flow rate is greater than the first constant flow rate that resulted in the first maximum, self-limiting, depth 114'. In embodiments, to achieve the deeper second maximum, self-limiting, depth 114', the second hydraulic diameter $d_h$ is wider than the first hydraulic diameter $d_h$ that resulted in the first maximum, self-limiting, depth 114'. For example, a different permeable porous cellular body 14' with channels 26' having a wider hydraulic diameter $d_h$ can be chosen.

In embodiments, to achieve the deeper second maximum, self-limiting, depth 114', the second absorptive capacity of the porous cellular body 14' is less than the first absorptive capacity that resulted in the first maximum, self-limiting, depth 114. For example, the channels 26' of the porous cellular body 14' chosen to receive the plugging mixture 100 in the subsequent iteration of steps 202 and 204 can be contacted with water (such as by soaking the porous cellular body 14' in water) or coated with a hydrophobic coating, as mentioned above.

In embodiments, to achieve the deeper second maximum, self-limiting, depth 114', the second permeability of inorganic particles within the plugging mixture 100 is less than the first permeability that resulted in the first maximum, self-limiting, depth 114'. For example, a different plugging mixture 100' can be utilized for the subsequent iteration of steps 202 and 204 that has a smaller average particle size of the inorganic particles with a fixed particle size distribution breadth, or a broader particle size distribution of the inorganic particles at the same average particle size.

In embodiments, to achieve the deeper second maximum, self-limiting, depth 114', the second viscosity of the liquid in the plugging mixture 100' is greater than the first viscosity of the liquid in the plugging mixture 100 that resulted in the first maximum, self-limiting, depth 114, while maintaining approximately the same overall viscosity of the plugging mixture 100' as plugging mixture 100. For example, a different plugging mixture 100' can be utilized for the subsequent iteration of steps 202 and 204 that has a greater amount of dissolved polymer in the water than the plugging mixture 100 that resulted in the first maximum, self-limiting, depth 114. The volumetric solids loading in the plugging mixture 100' can be reduced compared to the plugging mixture 100 in an attempt to maintain approximately the same overall viscosity for the plugging mixture 100'.

In embodiments, to achieve the deeper second maximum, self-limiting, depth 114', the second viscosity of the plugging mixture 100' is less than the first viscosity of the plugging mixture 100 that resulted in the first maximum, self-limiting, depth 114 while maintaining approximately the same viscosity for the liquid of the plugging mixture 100' as for the plugging mixture 100. For example, a different plugging mixture 100' can be utilized for the subsequent iteration of steps 202 and 204 that has less volumetric solids loading but the same liquid composition as the plugging mixture 100 that resulted in the first, maximum, self-limiting depth 114.

In embodiments, the second maximum, self-limiting, depth 114' of the plugging mixture 100' is shallower than the first maximum, self-limiting, depth 114. In embodiments, to achieve the shallower second maximum, self-limiting, depth 114', the second constant pressure is lower than the first constant pressure that resulted in the first maximum, self-limiting, depth 114. In embodiments, to achieve the shallower second maximum, self-limiting, depth 114', the second constant flow rate is less than the first constant flow rate that resulted in the first maximum, self-limiting, depth 114. In embodiments, to achieve the shallower second maximum, self-limiting, depth 114', the second hydraulic diameter $d_h$ is narrower than the first hydraulic diameter $d_h$ that resulted in the first maximum, self-limiting, depth 114. For example, a different permeable porous cellular body 14' with channels 26' having a narrower hydraulic diameter $d_h$ can be chosen.

In embodiments, to achieve the shallower second maximum, self-limiting, depth 114', the second absorptive capacity of the porous cellular body 14' is greater than the first absorptive capacity that resulted in the first maximum, self-limiting, depth 114. For example, if the channels 26 of the porous cellular body 14 utilized to obtain the first maximum, self-limiting, depth 114 were coated with a hydrophobic coating, the porous cellular body 14' utilized for the subsequent iteration of steps 202 and 204 does not include such a hydrophobic coating.

In embodiments, to achieve the shallower second maximum, self-limiting, depth 114', the second permeability of inorganic particles within the plugging mixture 100' is greater than the first permeability of the inorganic particles within the plugging mixture 100 that resulted in the first maximum, self-limiting, depth 114. For example, a different plugging mixture 100' can be utilized for the subsequent iteration of steps 202 and 204 that has a larger average particle size of the inorganic particles with a fixed particle size distribution breadth, or a narrower particle size distribution of the inorganic particles at the same average particle size.

In embodiments, to achieve the shallower second maximum, self-limiting, depth 114', the second viscosity of the liquid in the plugging mixture 100' is less than the first viscosity of the liquid in the plugging mixture 100 that resulted in the first maximum, self-limiting, depth 114, while maintaining approximately the same overall viscosity of the plugging mixture 100' compared to the plugging mixture 100. For example, a different plugging mixture 100' can be utilized for the subsequent iteration of steps 202 and 204 that has a lesser amount of dissolved polymer in the water than the plugging mixture 100 that resulted in the first maximum, self-limiting, depth 114. The volumetric solids loading in the plugging mixture 100' can be increased compared to the plugging mixture 100 in an attempt to maintain approximately the same overall viscosity for the plugging mixture 100' compared to the plugging mixture 100.

In embodiments, to achieve the shallower second maximum, self-limiting, depth 114', the second viscosity of the plugging mixture 100' is greater than the first viscosity of the plugging mixture 100 that resulted in the first maximum, self-limiting, depth 114 while maintaining approximately the same viscosity for the liquid of the plugging mixture 100' as the liquid of the plugging mixture 100. For example, a different plugging mixture 100' can be utilized for the subsequent iteration of steps 202 and 204 that has greater volumetric solids loading but the same liquid composition as the plugging mixture 100 that resulted in the first, maximum, self-limiting depth 114.

EXAMPLES

Provided below are non-limiting examples consistent with the present disclosure as well as comparative examples.

Figure 6:
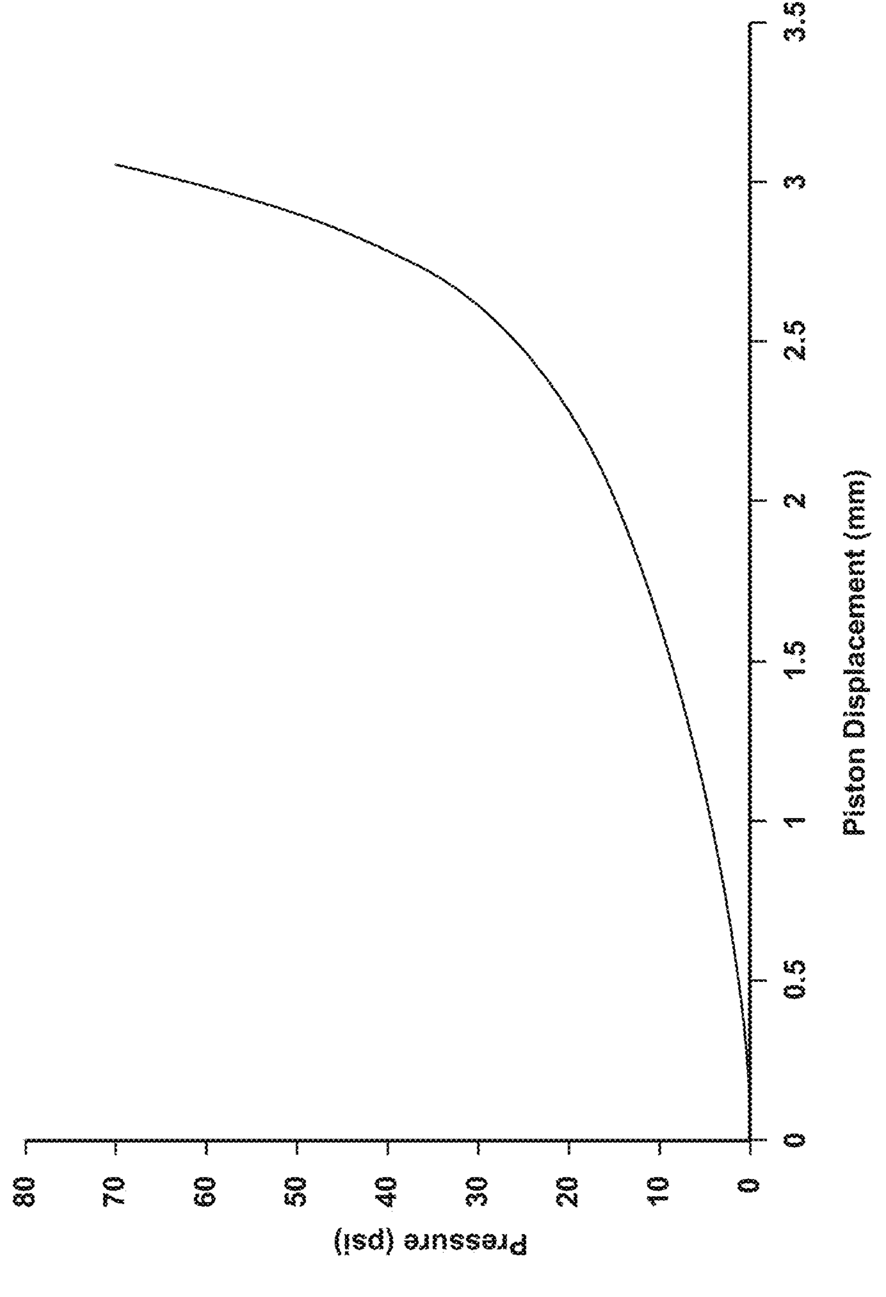
FIG. 6 is a graph of the piston displacement vs. pressure applied to a plugging mixture to force plugging mixture into channels of a porous cellular body, illustrating that as piston displacement increases, pressure applied to the plugging mixture rises.

Referring now to FIG. 6, provided is a graph of pressure (e.g., plugging pressure) generated as a function of piston (e.g., the plunger 108) displacement, specifically a piston displacing the plugging mixture 100 into the channels 26 of the porous cellular body 14. The piston displacement is a proxy for the volumetric flow of the plugging mixture 100 into the channels 26. The porous cellular body 14 for this graph had 200 channels 26 per square inch with 0.008 in thick intersecting walls 38. As can be seen, as the displacement of the piston increases, the pressure required to push more of the plugging mixture 100 into the porous cellular body 14 increases. The required pressure increases in a relatively linear manner (e.g., displacement of from about 0 mm to about 2.5 mm) and then began approaching an asymptote (e.g., the maximum achievable depth) where increases in the piston displacement require larger and larger pressure increases. The asymptotic nature of the pressure-displacement curve is due to the removal of liquid from the plugging mixture 100 and the consolidation of the solids of the plugging mixture 100.

Figure 7A:
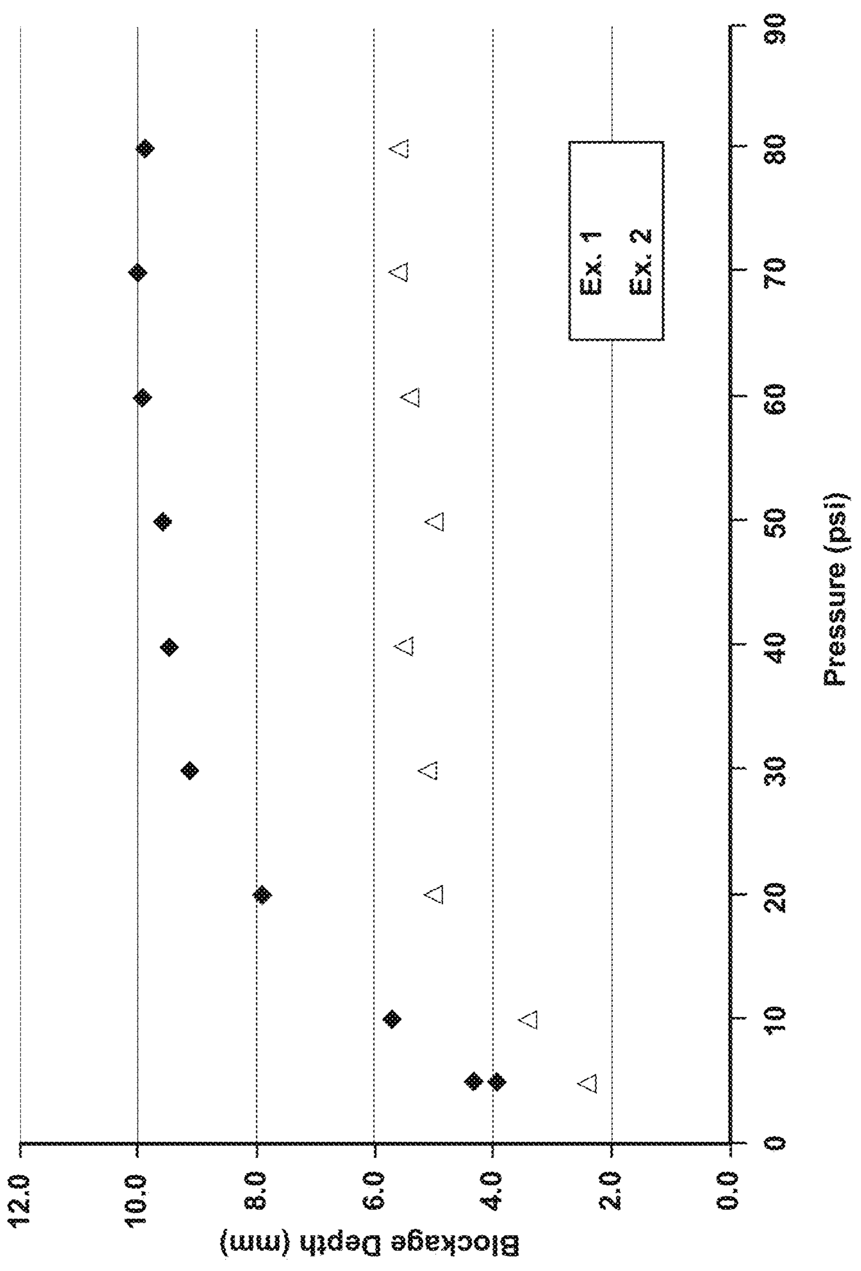
FIG. 7A is a graph of the depth of the plugging mixture during the method of plugging as described herein for two different porous cellular bodies, illustrating that as the flow rate of plugging mixture into the channels is maintained as constant, the channels are filled to a maximum, self-limiting depth and then the pressure upon the plugging mixture rises while additional plugging mixture enters the channels to fill voids and prevent dimples without achieving greater depth.

Referring now to FIG. 7A, therein presented is a graph of the depth 114 of the plugging mixture 100 during the method 80 as a function of plugging pressure where step **116*b* of the method 80 was utilized and a constant flow rate of the plugging mixture 100 into the channels 26 was maintained. The results for two different porous cellular bodies 14 are presented. The reference to "Ex. 1" refers to a porous cellular body 14 with 200 channels 26 per square inch, and 0.008 inch thick intersecting walls 38. The reference to "Ex. 2" refers to a porous cellular body 14 with 300 channels 26 per square inch, and 0.008 inch thick intersecting walls 38. As the porous cellular body 14 of "Ex. 1" has less cells per square inch, the cells of "Ex. 1" had a larger cross-sectional area than the cells of "Ex. 2." The composition of the plugging mixture 100 was the same for both "Ex. 1" and "Ex. 2." For "Ex. 1," as the constant flow rate of the plugging mixture 100 causes the plugging mixture 100 to reach a maximum, self-limiting, depth 114 of just under 10 mm, maintaining the constant flow rate only results in the pressure on the plugging mixture 100 elevating from about 30 psi to 80 psi. Accordingly, the method 80 can cease at a predetermined pressure of, for example, 50 psi, which results in elimination of voids and dimples. For "Ex. 2," as the constant flow rate of the plugging mixture 100 causes the plugging mixture 100 to reach a maximum, self-limiting, depth 114 of just over 5 mm, maintaining the constant flow rate only results in the pressure on the plugging mixture 100 elevating from about 20 psi to 80 psi. Accordingly, the method 80** can cease at a predetermined pressure of, for example, 40 psi, which results in elimination of voids and dimples.

Figure 7B:
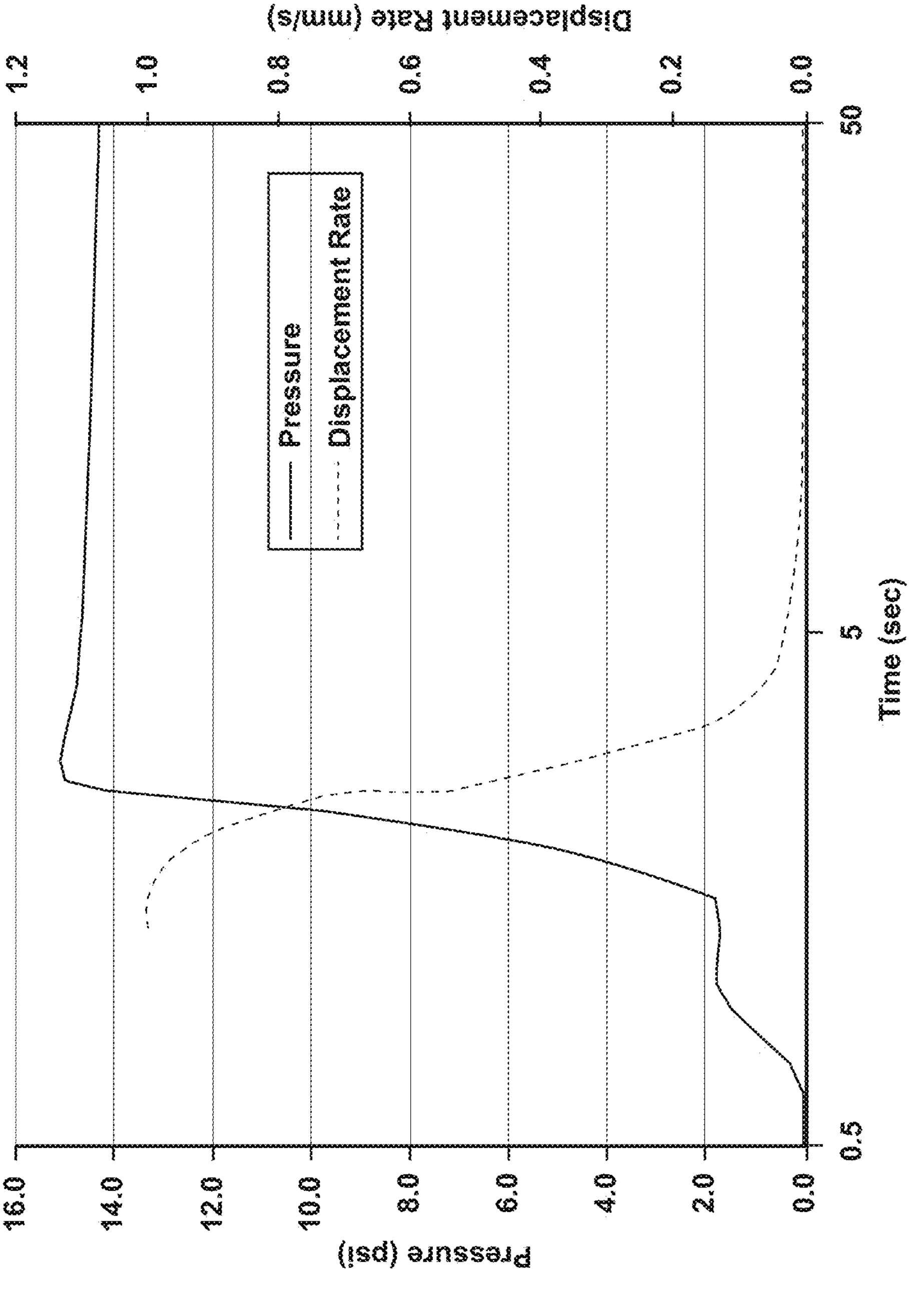
FIG. 7B is a graph of pressure applied to the plugging mixture and displacement rate of a plunger as a function of time during the method of plugging as described herein, illustrating that as the pressure applied to the plugging mixture is maintained as constant, the channels are filled to a maximum, self-limiting depth and then the displacement rate (approximation of the flow rate of the plugging mixture) decays while additional plugging mixture enters the channels to fill voids and prevent dimples.

Referring now to FIG. 7B, therein presented is a graph of pressure applied to the plugging mixture 100 and the plunger 108 displacement rate as a function of time during the method 80 where step 116*a* of the method 80 was utilized and a constant pressure applied to the plugging mixture 100 was maintained. During the application of the constant pressure in step 116*a* after about 2.5 seconds, the displacement rate of the plunger 108 (approximates the flow rate of the plugging mixture 100 into the channels 26) decays. As the displacement rate decays to a predetermined displacement rate (approximating a predetermined flow rate) just above 0 mm/s between approximately 5-10 seconds (such as 0.01 mm/s), the constant pressure (of approximately 15 psi) can cease. The plugging mixture 100 will have reached the maximum, self-limiting, depth 114 and the continued flow of the plugging mixture 100 while the displacement rate (flow rate) decays eliminates voids and dimples in the plugging mixture 100.

Figure 8:
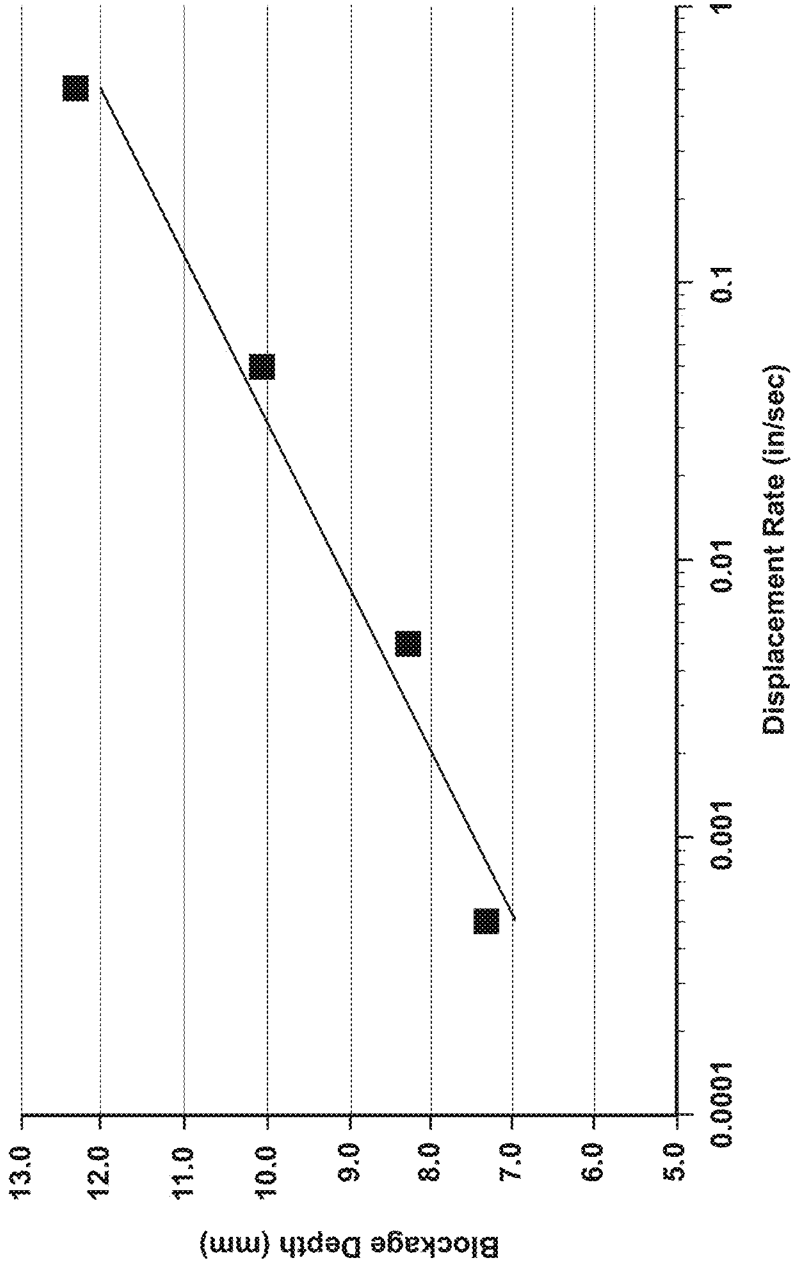
FIG. 8 is a graph of maximum, self-limiting, depth as a function of plugging rate (approximating rate of flow of plugging mixture into the channels), illustrating that the maximum, self-limiting, depth increases as the constant plugging rate chosen rises.

Referring now to FIG. 8, therein presented is a graph of maximum, self-limiting, depth 114 for a plugging mixture 100 as a function of plugging rate (plunger 108 displacement rate, which approximates flow rate of the plugging mixture 100 into the channels 26). The results illustrate the point mentioned above that increasing the constant flow rate of the plugging mixture 100 during the method 80 increases the maximum, self-limiting depth 114. Such a relationship can be explained by the understanding that the liquid of the plugging mixture 100 is removed as it contacts the intersecting walls 38. For example, the slower the plugging mixture 100 is injected, the more time the intersecting walls 38 have to absorb liquid from the plugging mixture 100 thus resulting in smaller maximum, self-limiting, depths 114. Conversely, the faster the plugging mixture 100 is injected, the deeper the plugging mixture 100 can reach into the channels 26 before the intersecting walls 38 absorb liquid from the plugging mixture 100 thus resulting in larger maximum, self-limiting, depths 114.

Figure 9:
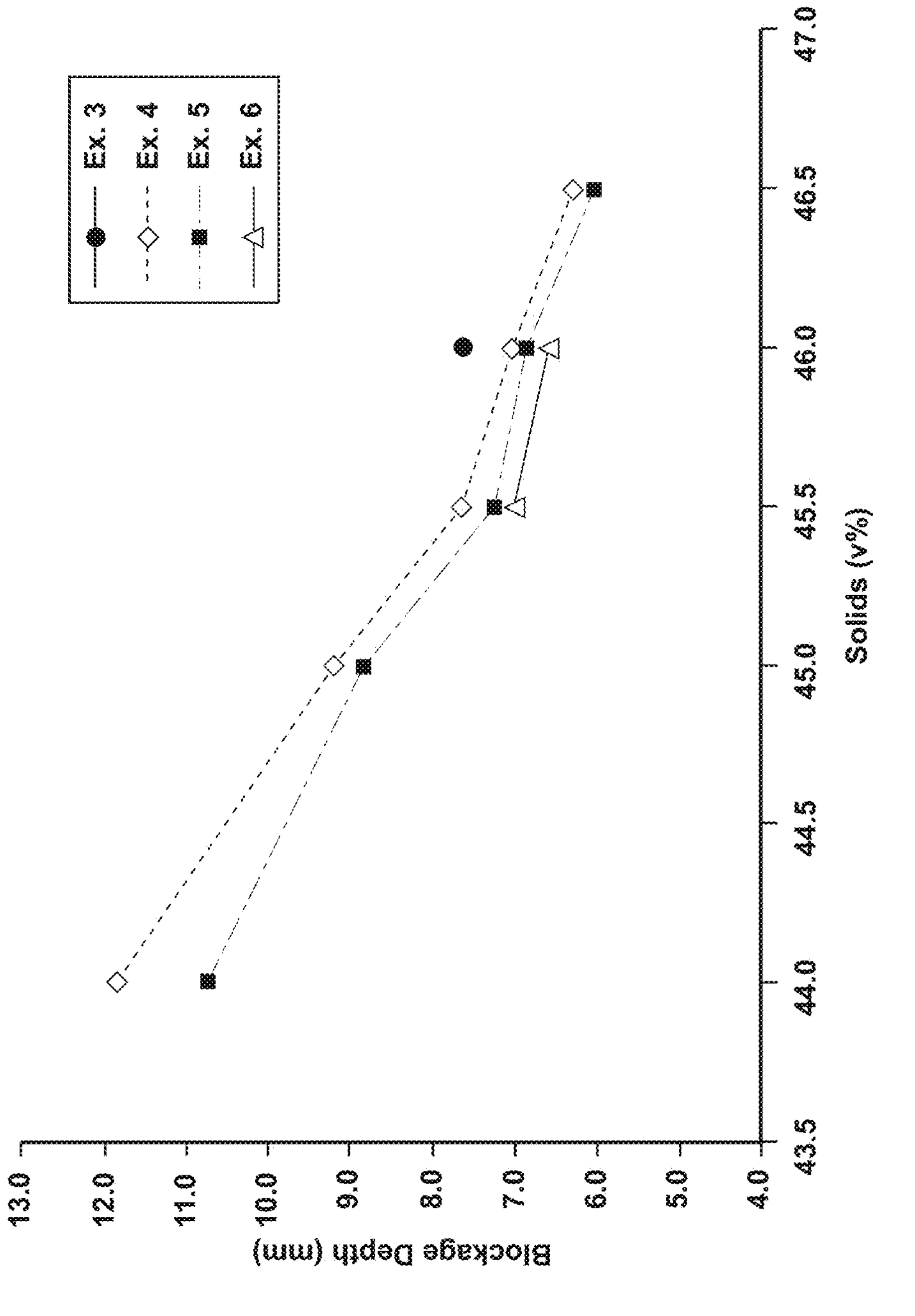
FIG. 9 is a graph of maximum, self-limiting, depth as a function of percent volume of solids in the plugging mixture, for different plugging mixture formulations varying as a function of the concentration of a water soluble polymer (Methocel®) dissolved in the liquid of the plugging mixture, illustrating (a) that for any given concentration of the water soluble polymer, the maximum, self-limiting, depth decreases as the volume percentage of solids in the plugging mixture increases, and (b) that for any given volume percentage of solids in the plugging mixture, the maximum, self-limiting, depth decreases as the concentration of the water soluble polymer in the liquid of the plugging mixture decreases.

Referring now to FIG. 9, therein presented is a graph of the maximum, self-limiting, depth 114 as a function of the volume percentage of solids in the plugging mixture 100 and the concentration of a water soluble polymer present in the plugging mixture 100 relative to water to modify the viscosity. More specifically, Examples 3-6 ("Ex. 3" and so on) utilize progressively decreasing concentrations of a water soluble polymer (organic binder) present relative to water in the plugging mixture 100 to decrease the viscosity of the liquid in the plugging mixture 100. Example 3 includes 2.9 wt % of Methocel® A4M, Example 4 includes 2.7 wt % of Methocel® A4M, Example 5 includes 2.5 wt % of Methocel® A4M, and Example 6 includes 2.3 wt % of Methocel® A4M. In addition, each particular example includes data points measuring the maximum, self-limiting, depth 114 for progressively increasing volume percentage of solids in the plugging mixture 100 (from left to right along the x-axis), which increases the viscosity of the plugging mixture 100 as a whole.

The graph illustrates several things. Among other things, the graph illustrates that increasing the concentration of the water soluble polymer (e.g., Example 4 included more Methocel® than Example 5), which increases the viscosity of the liquid in the plugging mixture 100, causes an increase in the maximum, self-limiting, depth 114, for any particular fixed volumetric solids loading in the plugging mixture 100. As the viscosity of the liquid in the plugging mixture 100 increases, it becomes harder for the liquid in the plugging mixture 100 to leave the plugging mixture 100 and enter the intersecting walls 38. In addition, the graph illustrates that lowering the volumetric solids loading of the plugging mixture 100 at fixed liquid viscosity (which lowers the viscosity of the plugging mixture 100) increases the maximum, self-limiting, depth 114. As the percent volume of solids is decreased for any particular example, including the same amount of water soluble polymer, the maximum, self-limiting, depth 114 increases.

Figure 10A:
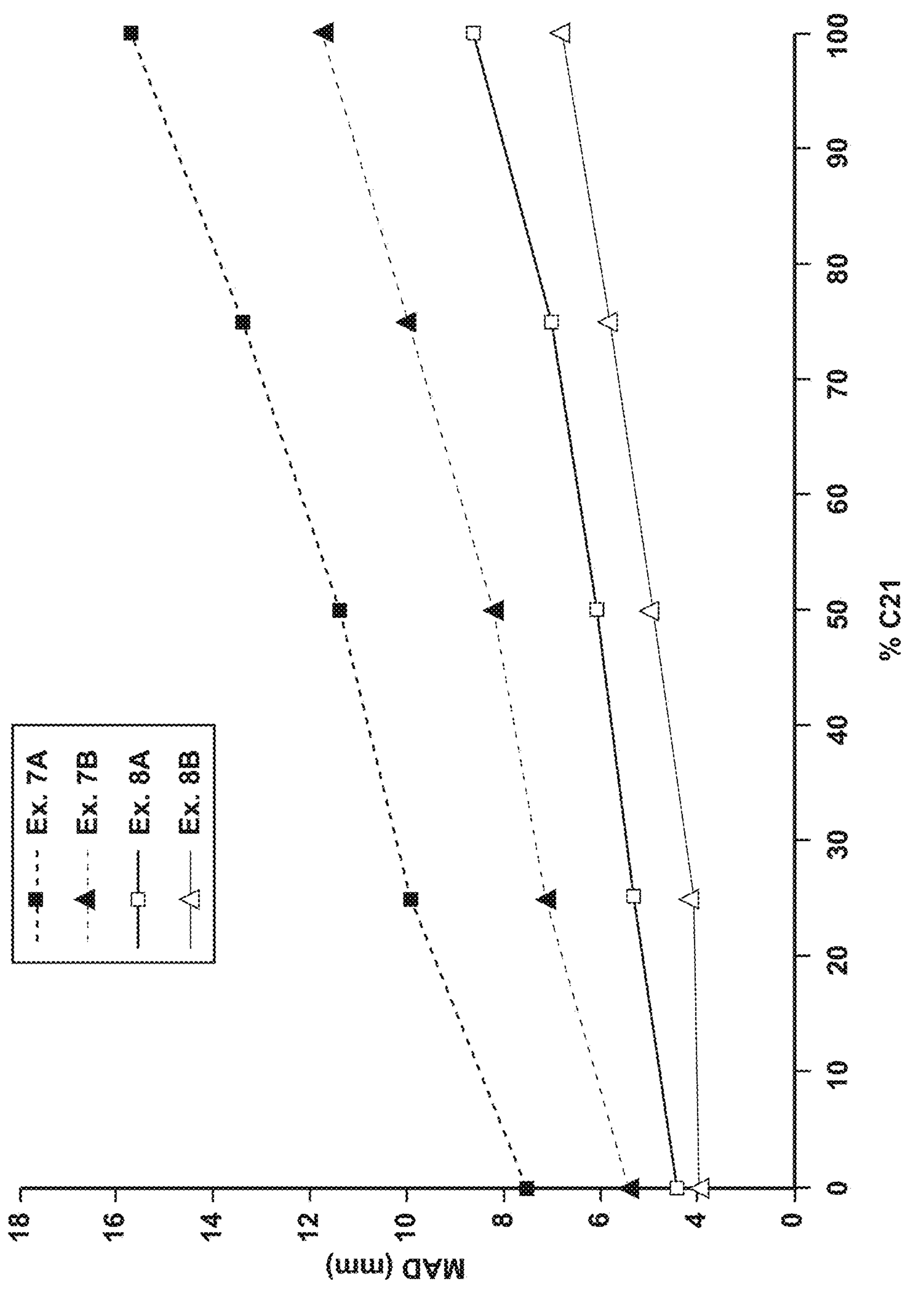
FIG. 10A is a graph of maximum, self-limiting, depth as a function of particle size distribution and channel size, for two different plugging mixtures varying as a function of overall plugging mixture viscosity, illustrating that maximum, self-limiting, depth increases (a) as the average particle size of the inorganic particles of the plugging mixture decreases, (b) as the overall plugging mixture viscosity decreases, and (c) as the hydraulic diameter $d_h$ of the channel into which the plugging mixture is forced increases.
Figure 10B:
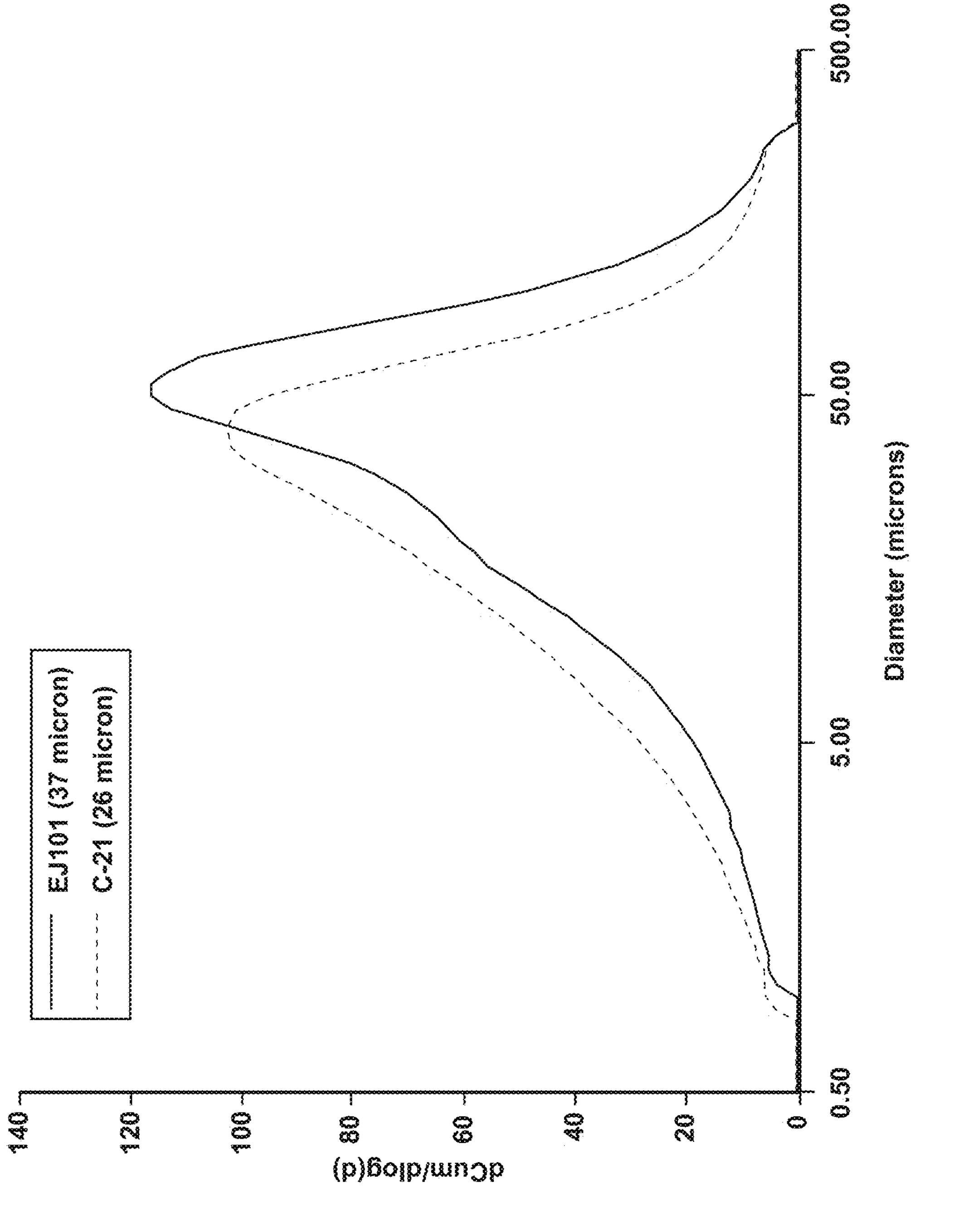
FIG. 10B is a graph of the particle size distribution of two different inorganic particles used to vary the average particle size of the combined inorganic particles of the plugging mixtures of Examples 7A-8B mentioned in connection with FIG. 10A.

Referring now to FIG. 10A, therein presented is a graph of the maximum, self-limiting, depth 114 as a function of (a) particle size distribution of the solids in the plugging mixture 100, (b) the viscosity of the plugging mixture 100, and (c) location of the plugging mixture 100 as inlet versus outlet, i.e., first end 18 or second end 22 as described above. FIG. 10B, in turn, illustrates particle size distribution and average particle size for two different solids—EJ101 (having an average particle size of 37 μm) and C-21 Grog (having an average particle size of 26 μm).

As mentioned above, decreasing the average particle size of the inorganic particles with a fixed particle size distribution breadth decreases the permeability of liquid through the inorganic particles of the plugging mixture 100, due to the increasing concentration of finer inorganic particles in a mixture of two inorganic materials, which increases the maximum, self-limiting, depth 114. This is illustrated in the graph of FIG. 10A. As the percent "C21 Grog" increases for any given example, thus decreasing the average particle size of the inorganic particles within the plugging mixture 100, the maximum, self-limiting, depth 114 increases.

As further mentioned above, lowering the viscosity of the plugging mixture 100 increases the maximum, self-limiting, depth 114. This is illustrated in the graph of FIG. 10A. Examples 7A and 7B, both measured at the outlet (second end 22), varied in the viscosity of the plugging mixture 100—Example 7A had a lower viscosity (0.3) than Example 7B (0.7) as measured using a ball push test, a difference in water content causing the difference in viscosity (Example 7A had more water). Because Example 7A had a lower viscosity than Example 7B, Example 7A provided a higher maximum, self-limiting, depth 114.

As further mentioned above, the channels 26 at the inlet (first end 18) into which the plugging mixture 100 is inserted are narrower than the channels 26 at the outlet (second end 22) into which the plugging mixture 100 is inserted. Examples 7A and 8A are the same plugging mixture 100, just inserted into the outlet (second end 22) and inlet (first end 18) respectively. Likewise, Examples 7B and 8B are the same plugging mixture 100, just inserted into the outlet (second end 22) and inlet (first end 18) respectively. As Example 7A versus Example 8A, and Example 7B versus Example 8B demonstrates, the larger the channels 26 into which the plugging mixture 100 is inserted, the greater the maximum, self-limiting, depth 114. The smaller channels 26 at the inlet (first end 18) than the outlet (second end 22) cause a higher pressure upon the plugging mixture 100, resulting in a faster flow of liquid from the plugging mixture 100 into the intersecting walls 38, resulting in a smaller maximum, self-limiting, depth 114 at the channels 26 of the inlet (first end 18).

Figure 11:
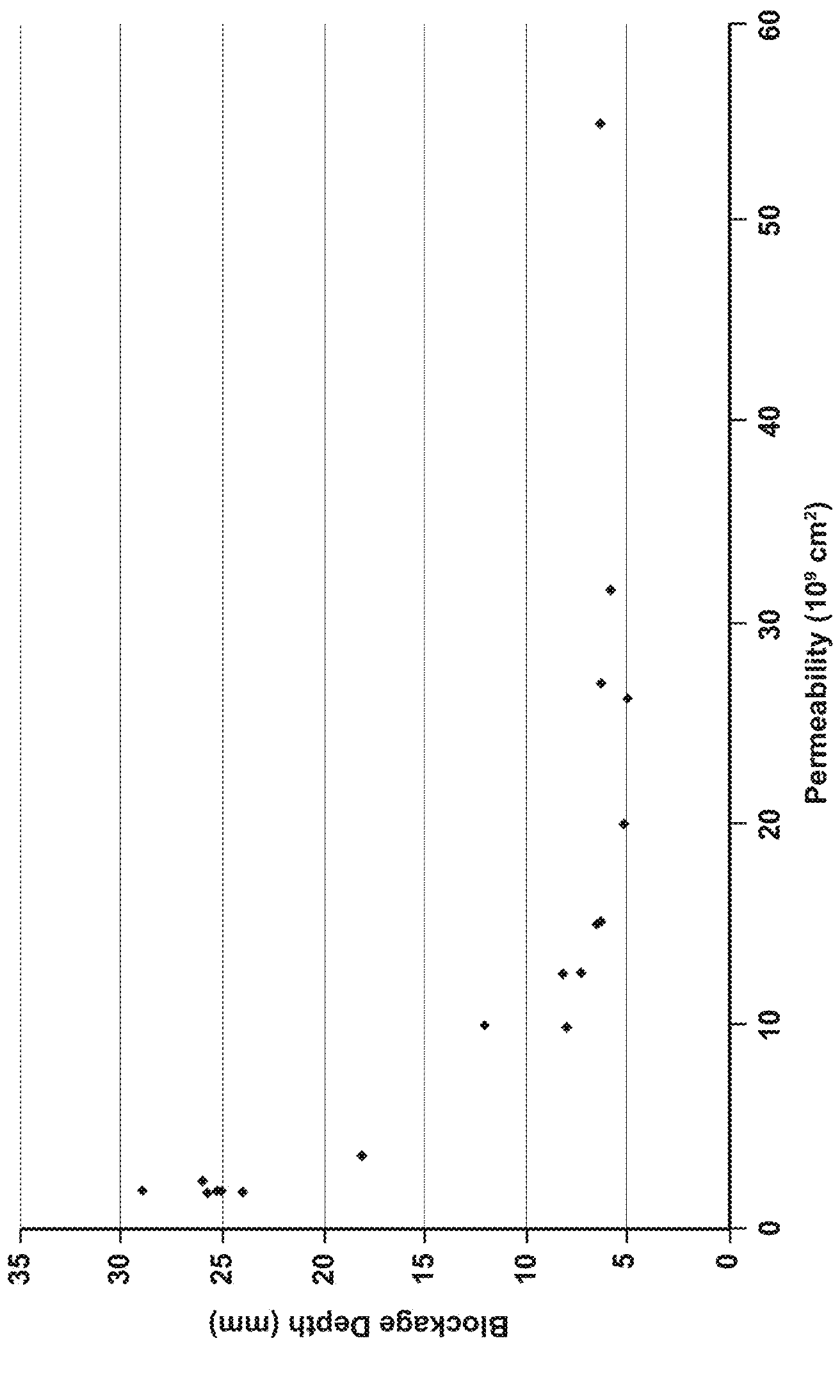
FIG. 11 is a graph of the maximum, self-limiting, depth as a function of the permeability of the inorganic particles of the plugging mixture, illustrating that increasing the permeability of the inorganic particles of the plugging mixture decreases the maximum, self-limiting, depth, within a certain permeability range.
Figures 12A, 12B:
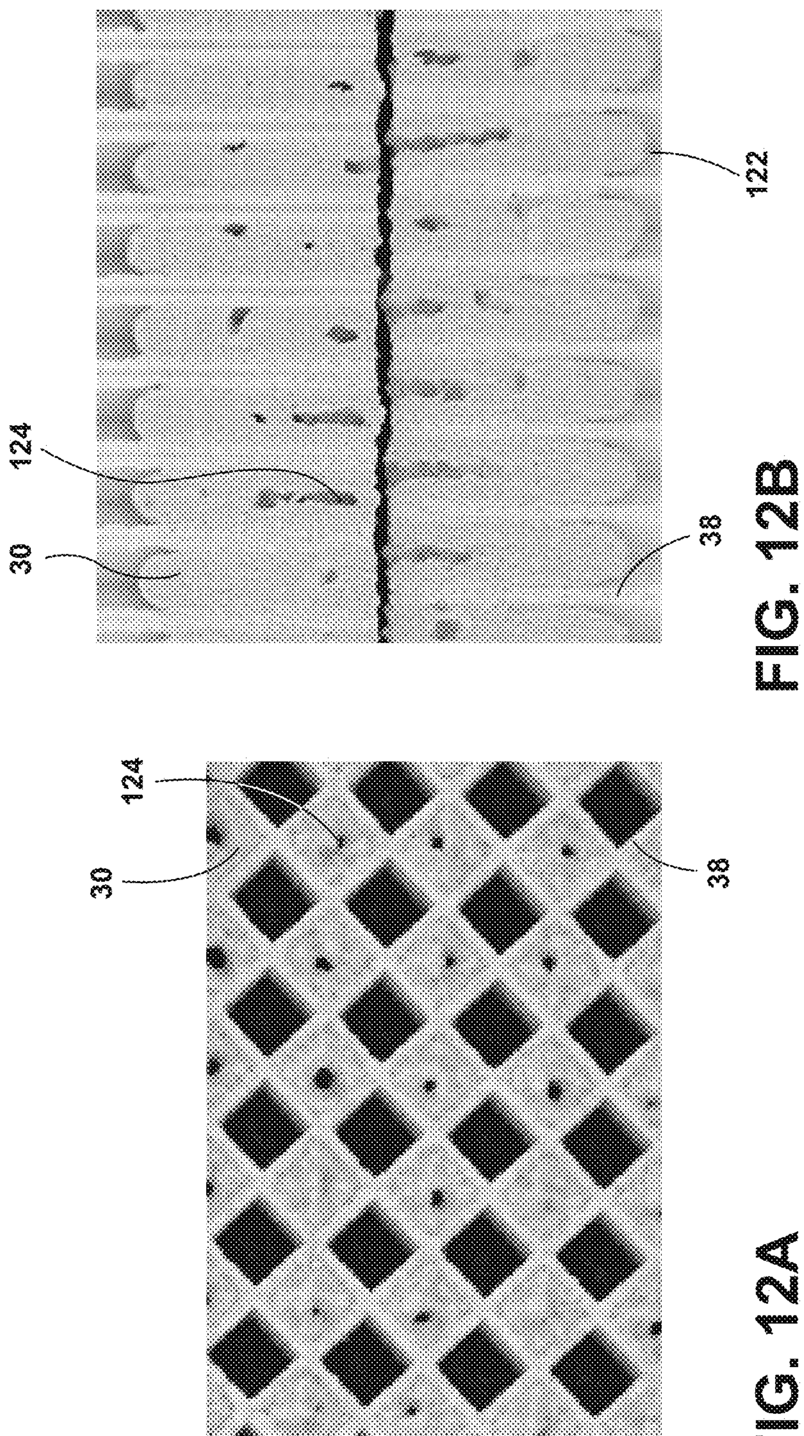
FIGS. 12A and 12B are images of comparative plugs prepared via a prior method that resulted in dimples and voids within the plugs after sintering.
Figures 13A, 13B:
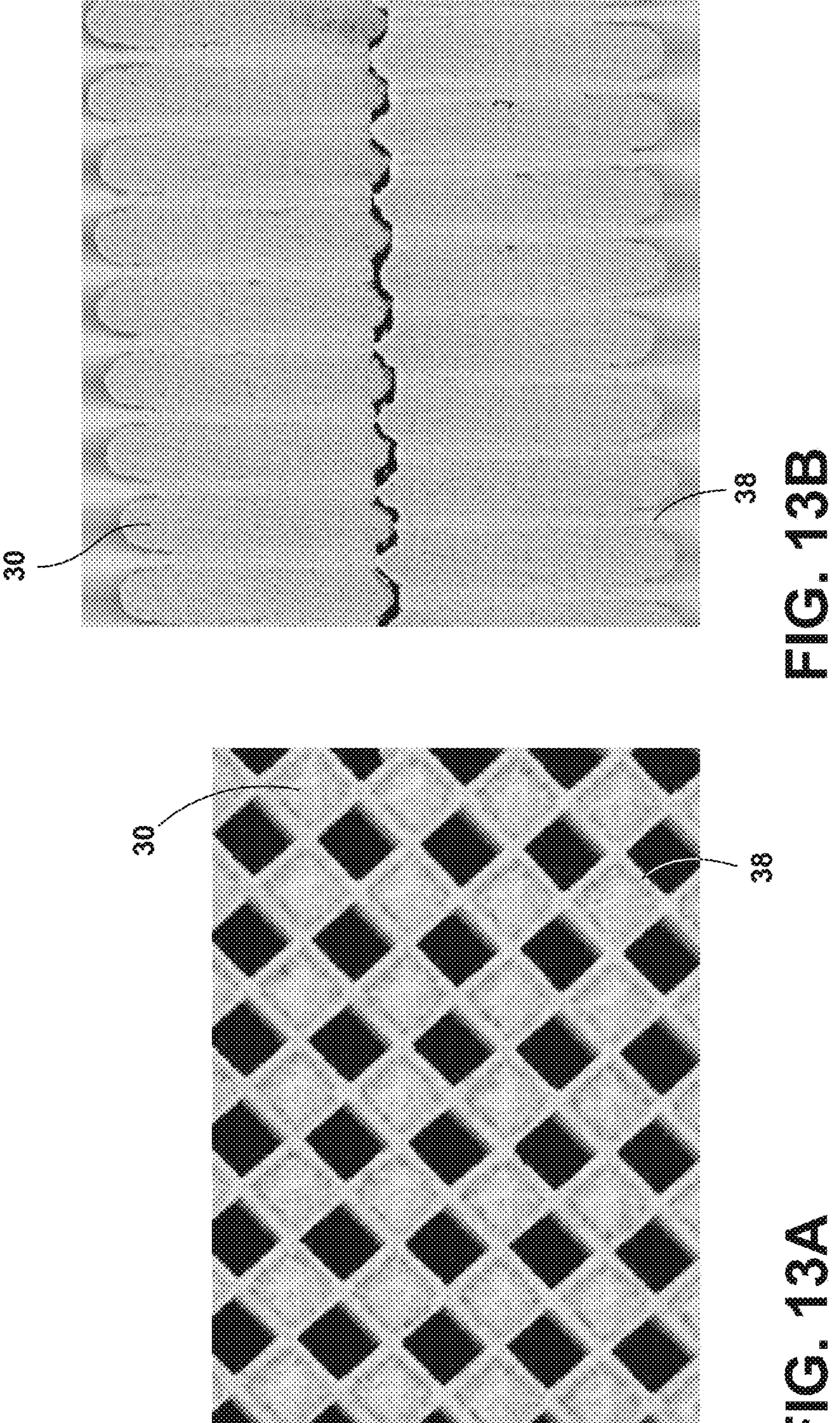
FIGS. 13A and 13B are images of plugs prepared according to the method of the present disclosure, illustrating that the method produces plugs without dimples and voids.

Referring now to FIG. 11, therein presented is a graph of the maximum, self-limiting, depth 114 as a function of the gas permeability of the inorganic particles of the plugging mixture 100. As mentioned above, decreasing the permeability of the inorganic particles of the plugging mixture 100 increases the maximum, self-limiting, depth 114. As such permeability increases, liquid can more easily exit the plugging mixture 100, thus decreasing the maximum, self-limiting, depth 114. The opposite is true as well. The graph shows this-small decreases of the permeability of the inorganic particles at low permeability (e.g., less than $15*10^9$ $cm^2$) provides relatively large increases in the maximum, self-limiting, depth 114. Changes in the permeability at relatively high permeability (i.e., greater than $20*10^9$ $cm^2$) does not affect the maximum, self-limiting, depth 114, because the rate at which the liquid in the plugging mixture 100 can flow around the inorganic particles is not significantly altered by further increases in the size of the organic particles.

Referring now to FIGS. 12A-13B, therein presented are images of the plugs 30. The plugs 30 of FIGS. 12A and 12B were prepared via prior methods that did not utilize the maximum, self-limiting, depth 114 and thus show dimples 122 and voids 124. The plugs 30 of FIGS. 13A and 13B were prepared via the method 80 of the present disclosure that does utilize the maximum, self-limiting, depth 114 and either: (a) maintains a constant pressure (via the plunger 108 or otherwise) on the plugging mixture 100 until a flow rate of the plugging mixture 100 decays to a predetermined (non-zero) flow rate at step 116*a*; or (b) maintains a constant flow rate of the plugging mixture 100 into the channels 26 until a pressure on the plugging mixture 100 elevates to a predetermined pressure at step 116*b*. The results are the plugs 30 without dimples 122 or voids 124. The absence of the dimples 122 and voids 124 is due to the consolidation of the plugging mixture 100.

It will be apparent to those skilled in the art that various modifications and variations can be made without departing from the spirit or scope of the claims.

What is claimed is:

1. A method of plugging a permeable porous cellular body, comprising:

contacting the permeable porous cellular body with a plugging mixture, the permeable porous cellular body defining a plurality of channels; and forcing the plugging mixture into the plurality of channels with a plunger at a constant displacement rate of the plunger until a pressure on the plugging mixture is increased to a predetermined pressure and a maximum self-limiting depth of plugging mixture is disposed in the plurality of channels.

2. The method of claim 1, wherein the predetermined pressure is from about 5 psi to about 100 psi.

3. The method of claim 1, wherein the predetermined pressure is from about 20 psi to about 50 psi.

4. The method of claim 1, wherein the predetermined pressure is from about 10 psi to about 40 psi.

5. The method of claim 1, further comprising heating the plugging mixture in the permeable porous cellular body.

6. The method of claim 5, wherein the heating is performed at a temperature from about 350° C. to about 600° C.

7. The method of claim 5, wherein the heating is performed at a temperature from about 800° C. to about 1500° C.

8. The method of claim 5, wherein the heating comprises heating the permeable porous cellular body to a first temperature in a range from about 350° C. to about 600° C. and thereafter heating the permeable porous cellular body to a second temperature in a range from about 800° C. to about 1500° C.

9. The method of claim 1, wherein the permeable porous cellular body comprises a ceramic material and further comprises permeable and porous intersecting walls that separate the plurality of channels.

10. The method of claim 1, wherein the permeable porous cellular body comprises from about 10 channels per square inch to about 900 channels per square inch.

11. The method of claim 1, wherein the maximum, self-limiting depth is less than about 30 mm.

12. The method of claim 1, wherein the maximum, self-limiting depth is less than about 13 mm.

13. A method of plugging a permeable porous cellular body, comprising:

contacting the permeable porous cellular body with a plugging mixture, the permeable porous cellular body defining a plurality of channels;

forcing the plugging mixture into at least one channel of the plurality of channels with a plunger at a constant displacement rate of the plunger until a maximum, self-limiting, depth of the plugging mixture is disposed within the plurality of channels; and calcining the plugging mixture in the permeable porous cellular body by heating the plugging mixture in the permeable porous cellular body to a first temperature in a range from about 350° C. to about 600° C.

14. The method of claim 13, further comprising, after the calcining, heating the calcined plugging mixture in the permeable porous cellular body to second temperature in a range from about 800° C. to about 1500° C. to form a plurality of plugs.

15. The method of claim 13, wherein the permeable porous cellular body comprises permeable and porous intersecting walls that separate the plurality of channels.

16. The method of claim 13, wherein the permeable porous cellular body comprises from about 10 channels per square inch to about 900 channels per square inch.

17. A method of plugging a permeable porous cellular body, comprising:

contacting the permeable porous cellular body with a plugging mixture, the permeable porous cellular body defining a plurality of channels; and forcing the plugging mixture into the plurality of channels with a plunger at a constant displacement rate of the plunger until a pressure on the plugging mixture increases to a predetermined pressure and a maximum, self-limiting, depth of plugging mixture less than about 30 mm is disposed within the plurality of channels, or forcing the plugging mixture into the plurality of channels with the plunger at a constant pressure on the plugging mixture such that a displacement rate of the plunger decreases from an initial displacement rate to a predetermined displacement rate and a maximum, self-limiting, depth of plugging mixture less than about 30 mm is disposed within the plurality of channels.

18. The method of claim 17, wherein the predetermined pressure is from about 5 psi to about 100 psi.

19. The method of claim 17, wherein, after the forcing, heating the permeable porous cellular body to a temperature in a range from about 350° C. to about 600° C.

20. The method of claim 17, wherein, after the forcing, heating the permeable porous cellular body to a temperature in a range from about 800° C. to about 1500° C.

* * * * *